(12) United States Patent
Makinen et al.

(10) Patent No.: US 11,463,738 B2
(45) Date of Patent: Oct. 4, 2022

(54) DELIVERING ON-DEMAND VIDEO VIEWING ANGLES OF AN ARENA

(71) Applicant: Charter Communications Operating, LLC, St. Louis, MO (US)

(72) Inventors: Sami Makinen, Littleton, CO (US); Yassine Maalej, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/692,662

(22) Filed: Nov. 22, 2019

(65) Prior Publication Data
US 2021/0160549 A1    May 27, 2021

(51) Int. Cl.
| | | |
|---|---|---|
| *H04N 7/173* | (2011.01) | |
| *H04N 21/218* | (2011.01) | |
| *H04N 21/2187* | (2011.01) | |
| *H04N 21/234* | (2011.01) | |
| *H04N 21/44* | (2011.01) | |
| *H04N 21/472* | (2011.01) | |

(52) U.S. Cl.
CPC ... *H04N 21/21805* (2013.01); *H04N 21/2187* (2013.01); *H04N 21/23418* (2013.01); *H04N 21/44008* (2013.01); *H04N 21/47202* (2013.01)

(58) Field of Classification Search
CPC ........... H04N 21/23418; H04N 21/631; H04N 21/25825; H04N 21/4557; H04N 21/2187
USPC ....... 725/91; 348/36, 705, 169, 588, 157, 48
See application file for complete search history.

(56) References Cited

U.S. PATENT DOCUMENTS

| | | | |
|---|---|---|---|
| 9,935,992 B2 | 4/2018 | Rajagopal et al. | |
| 2008/0178232 A1 | 7/2008 | Velusamy | |
| 2013/0148861 A1* | 6/2013 | Ferlatte | G06K 9/00724 |
| | | | 382/107 |
| 2016/0381110 A1* | 12/2016 | Barnett | H04L 65/601 |
| | | | 709/231 |
| 2021/0092464 A1* | 3/2021 | Gupta | A63F 13/50 |

OTHER PUBLICATIONS

J. Samit, "5 Ways Emerging Tech Is Tackling the Game of Football", Fortune, Fortune's Technology Newsletter, Aug. 1, 2017, 2 pages.

A. Glaser, "The Cameras That'll Make the Super Bowl Way More Interesting This Year" Gear, Jan. 27, 2016, 10 pages, "https://www.wired.com/2016/01/the-cameras-thatll-make-the-super-bowl-way-more-interesting-this-year/".

(Continued)

*Primary Examiner* — Jivka A Rabovianski
(74) *Attorney, Agent, or Firm* — The Marbury Law Group, PLLC

(57) ABSTRACT

Various embodiments describe methods, systems, and devices for delivering on-demand video viewing angles of an arena at a venue are disclosed. Exemplary implementations may receive images of an event taking place across a plurality of positions within the arena from a series of cameras surrounding the plurality of positions. Content of interest may be identified within the images for a select user. Also, a score may be determined for each of the images based on the identified content of interest for the select user. A highest-score position may be determined from the plurality of positions based on the determined score and an offer to view images of the highest-score position may be transmitted to a display device of the select viewer for viewing video of the event.

45 Claims, 19 Drawing Sheets

(56) References Cited

OTHER PUBLICATIONS

C. Morris, CNBC Contributor "Intel claims it has the power to put you directly on a concert stage or NFL field", published Jun. 26, 2018, "https://www.cnbc.com/2018/06/25/intels-new-technology-puts-you-directly-in-the-middle-of-nfl-action.html", 6 pages.

N. Lee, "How off-the-shelf cameras are powering baseball's next-gen replays", May 22, 2018, https://www.engadget.com/2018/05/22/4dreplay-baseball-360-video/, 16 pages.

* cited by examiner

DELIVERING ON-DEMAND VIDEO VIEWING ANGLES OF AN ARENA

BACKGROUND

Watching sport competitions at venues, as well as through live video broadcasts, remains popular. With the advent of video services like instant replay and specialized television channels that provide coverage of multiple simultaneous games, viewers are becoming increasingly accustomed to being provided an enhanced viewing experience. In fact, many sports venues (also referred to as arenas) provide supplemental video footage on big screens at the venue to give attending spectators to a live event some of those advanced video features that the attending spectators might expect viewing the event from home through a video broadcast. Nonetheless, viewers (both home viewers and attending spectators) are still limited to viewing an event either from the perspective of their seat within the arena or a viewing angle chosen for them by a broadcast network distributing the video footage.

SUMMARY

Various aspects include methods for delivering on-demand video viewing angles of an arena at a venue to a user's viewing device. One aspect of the present disclosure relates to a method for delivering on-demand video viewing angles of an arena to a user's mobile device. The method may include receiving images of an event taking place across a plurality of positions within the arena from a series of cameras surrounding the plurality of positions. The series of cameras may be configured to capture images of each of the plurality of positions from at least three different viewing angles. The method may include identifying, by analyzing the plurality of images, content of interest within the images for a select user. The method may include determining a score for each of the images based on the identified content of interest for the select user. The method may include determining a highest-score position from the plurality of positions based on the determined scores. The method may include transmitting, to a viewing device of the user for viewing video of the event, an offer to view images of the highest-score position. The images of the highest-score position may be taken from a select viewing angle.

In some implementations, the content of interest may include at least one of an event participant, an event official, a primary event object, or arena landmarks.

In some implementations, determining the highest-score position may include determining an occupancy number for each of the plurality of positions. In some implementations of the method, the occupancy number may correspond to a total number of event participants, event officials, and primary event objects identified within the respective images. Some implementations may include accessing an event profile to determine parameters for scoring each of the images. The score for each of the images may be determined by applying the event profile to the identified content for determining the highest-score position.

In some implementations, the event profile may include at least one identifier selected from a group consisting of event rules, event patterns, participants, participant group identifiers, or user preferences of the select user.

In some implementations, the event profile may include a primary viewing angle of the select user. The score for each of the images may be determined using the primary viewing angle of the user to reduce the likelihood that images from the primary viewing angle will be offered for viewing in the transmitted offer to view images of the highest-score position.

In some implementations, the event profile may include a preferred viewing angle of the user. The score for each of the images may be determined using the preferred viewing angle of the user to increase the likelihood that images from the preferred viewing angle will be offered for viewing in the transmitted offer to view images of the highest-score position.

Some implementations may include determining at least one alternate view of the determined highest-score position. The at least one alternate view may correspond to images of the highest-score position from more than one different viewing angle than the select viewing angle. In some implementations, the offer to view images of the highest-score position may be transmitted to include the images from the different viewing angles.

Some implementations may include receiving, from the viewing device, a user selection corresponding to images of the highest-score position selected for viewing by the user. In some implementations of the method, it may include transmitting, by the processor to the viewing device, video that correspond to the user selection.

Some implementations may include receiving, from the viewing device, a user request for images of an alternate position different from the determined highest-score position. In some implementations, video of a viewing angle may be transmitted to the viewing device from the alternate position.

Some implementations may include receiving, from the viewing device, a user selection corresponding to a replay of a past event moment for viewing by the user. In some implementations of the method, it may include transmitting, by the processor to the viewing device, images that correspond to the replay of the past event moment.

In some implementations, the past event moment may have been captured at a previous time that may be a predetermined interval from a live broadcast time of the event.

Some implementations may include rendering video of the event based on a plurality of the received images. In some implementations, the plurality of received images may each be captured from different viewing angles and the rendered images may be a combination of the plurality of received images.

Some implementations may include rendering video of the event based on the plurality of received images. In some implementations of the method, the rendered images may include a close-up version of the plurality of received images.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above.

BRIEF DESCRIPTION OF THE DRAWINGS

The accompanying drawings, which are incorporated herein and constitute part of this specification, illustrate exemplary embodiments of the claims and together with the general description given above and the detailed description given below, serve to explain the features of the claims.

DETAILED DESCRIPTION

Figure 1A:
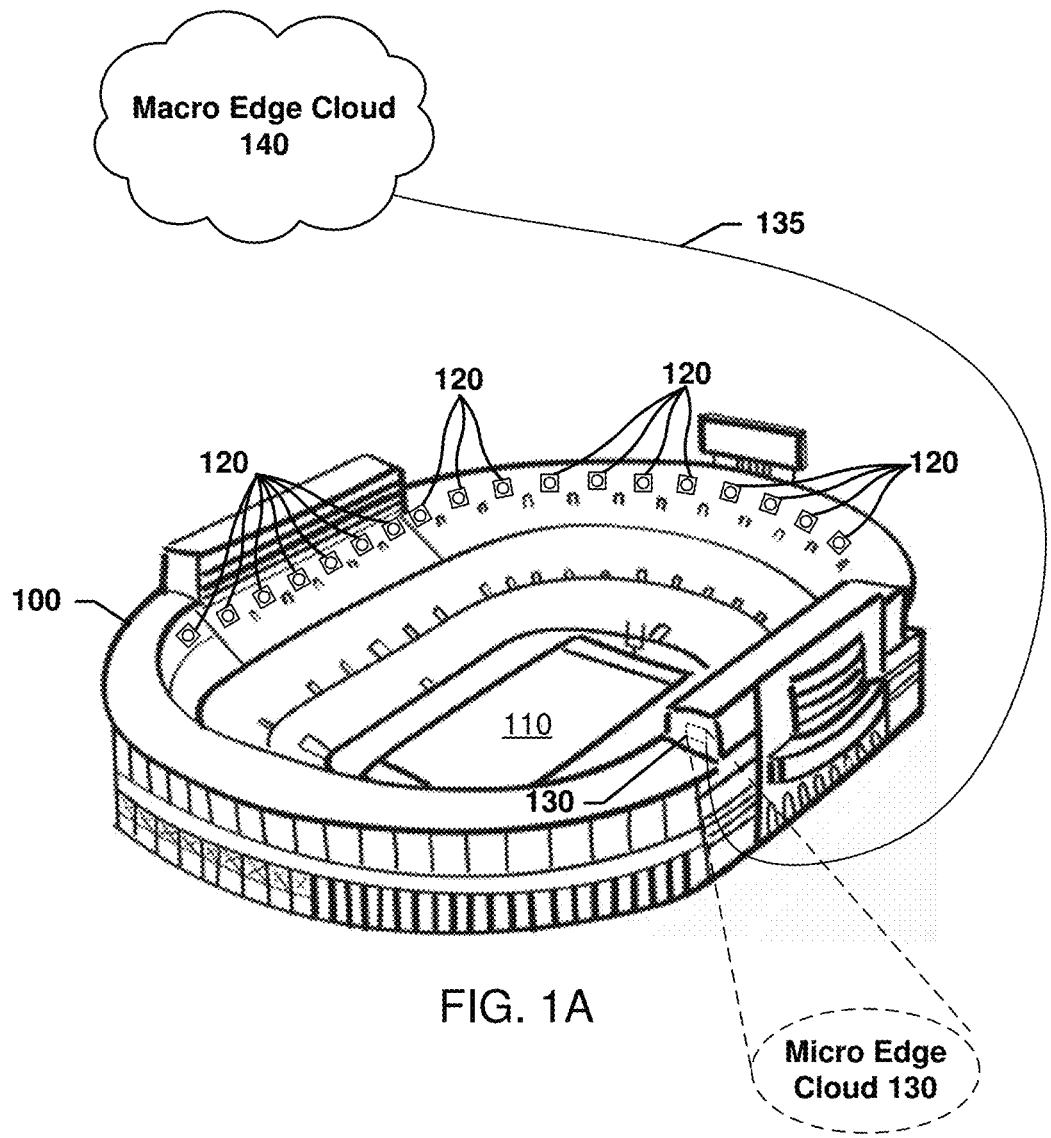
FIG. 1A is a schematic diagram conceptually illustrating an arena for a sporting event having cameras and a communications system in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, systems, and devices for delivering on-demand video viewing angles of an event occurring at an arena to one or more select users. Exemplary implementations may receive images of an event taking place across a plurality of positions within the arena from a series of cameras surrounding the plurality of positions. Content of interest within the images for each select user may be identified through imaging analysis to determine a score (e.g., value) for each of the images based on the identified content of interest. A highest-score position from the plurality of positions may be determined for each select user based on the determined score so that an offer to view images of the highest-score position may be transmitted to a display device of the respective select users for viewing video of the event. Determination regarding the highest-score position may be dynamic, constantly or often changing. Also, the highest-score position determination may be different every select user. The display device may include mobile devices, tablets, stationary monitors, portable computers, etc.

Often viewers of a live event in an arena, whether viewing from the arena or some remote location (i.e., at home or at a sports bar), witness a dramatic or never-seen-before move, play, or other event. Whether sitting in the stands at the arena 100 or watching from elsewhere, the viewing angle available to the viewer may not be optimal. For example, the view of the spectator in the stands of the arena 100 may be obstructed in some way (e.g., by a structure or other spectator). Similarly, the view provided to the remote viewer, watching a video broadcast of the event, is limited to the viewing angle selected by a video producer, which may also be obstructed in some way or too far away to make out the details of the event. In contrast, the view from the opposite side of the field 110 (i.e., pitch) may be optimal or at least better than the user's current view.

In accordance with various embodiments, users may be provided an option to request video footage of the event from almost any desired viewing angle. With cameras capturing images from different angles, images may be rendered for angles in between captured angles. By selecting a location in the arena 100 and a viewing angle of that location, or selecting a location and viewing angle from footage calculated to likely be of interest, the user may view the sporting from a previously unavailable vantage point. The footage provided to the user may be live footage (or semi-live; with only a slight delay) or instant replay footage (e.g., 60-90 second replay).

Various embodiments include a video capture and distribution system that uses a series of cameras surrounding an arena 100 of a sporting venue or entertainment event, like the field 110 at an arena, to capture and deliver customized event video from almost any viewing angle. Although virtually any viewing angle may be offered, users may be presented with a handful of the best viewing angles identified through analysis of captured video that recognizes moments of interest. Various event parameters may generally be used to recognize moments of interest, such as a clustering of players around one position in the arena. In addition, users may customize the event parameters used to recognize moments of interest to them.

As used herein, the term "computing device" is used to refer to any one or all of personal computers, portable computing devices, rack mounted computers, routers, mobile devices, cellular telephones, smart phones, smart watches, smart buttons, smart appliances, personal or mobile multi-media players, personal data assistants (PDAs), tablet computers, smart books, palm-top computers, desk-top computers, wireless electronic mail receivers, cellular telephones, wireless gaming controllers, streaming media players (such as, ROKU®), smart televisions, DVRs, modems, satellite or cable set top boxes, smart remote control devices (i.e., television remote controls with sufficient processing capabilities), and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

FIG. 1A illustrates an example of an arena 100 including a field 110 (also referred to as pitch, stage) for a sporting and/or entertainment event. The arena 100 may include a series of cameras 120 located in various positions surrounding the arena 110. The arena 100 may be a sports arena, such as for hockey, basketball, football, soccer, baseball, tennis, etc. and/or entertainment hall. In accordance with various embodiments, the cameras 120 may be interconnected to one another and/or to a micro edge cloud 130, which may in-turn be connected to a macro edge cloud 140 through various types of backhaul interfaces, such as a direct physical connection, a virtual network, or a combination thereof using any suitable transport network. The cameras 120 may communicate and be electronically linked with the micro edge cloud 130, located at the arena 100, over a wired or wireless communication links (not illustrated). Similarly, the micro edge cloud 130 may communicate with the macro edge cloud 140 over a wired or wireless communication link 135. All the cameras 120 or subgroups thereof may have an aggregation point for collecting and/or compiling the imaging, which may be disposed somewhere between the cameras 120 or subgroups and the micro edge cloud 130. The aggregation point(s) may provide more efficient data transfer to the micro edge cloud 130.

The cameras 120 may be dispersed throughout the arena 100, and each camera 120 may be stationary or mobile. For example, the arena 100 may use a series of 36 cameras positioned at 120 spaces around the outside of the arena 100 and facing toward the field 110 in order to perform a volumetric capturing of images. The cameras 120 may be strategically located at the arena 100 to ensure a clear view of the arena. Half (i.e., 18) of the cameras 120 are visible in FIG. 1A and the other half (i.e., 18) are on the opposite side of the arena 100. Although thirty-six (36) cameras 120 are included for illustrative purposes, various embodiments may include a fewer or greater number of cameras 120. Using at least 36 cameras 120 may ensure that image captures for any portion of the arena 100 may be captured from at least three, and preferably four or more, different viewing angles. The imaging captured from the different viewing angles may overlap one another. The cameras 120 may be low latency, high definition, imaging equipment configured with depth sensing and to zoom in and out, as well as pivot left, right, up, and down. In addition, actuators controlling the zoom and/or movement of the cameras 120 may be remotely controlled, such as from the micro edge cloud 130 or macro edge cloud 140.

The communication link 135 may use a variety of wireless (e.g., 5G-NR(u), LTE, etc.) and/or wired networks (e.g., Ethernet, TV cable, telephony, fiber optic and other forms of physical network connections) that may use one or more communication protocols, such as Ethernet, Point-To-Point protocol, High-Level Data Link Control (HDLC), Advanced Data Communication Control Protocol (ADCCP), and Transmission Control Protocol/Internet Protocol (TCP/IP). Various embodiments may use a minimum 10 Gbps Quality of Experience link.

The micro edge cloud 130 may include one or more computing devices generally located at an edge of a communication network, such as at a communication network access point. Communication network access points may include network base stations, cell phone towers, routers, Wi-Fi, and local data centers, and more. The micro edge cloud 130 may be configured with computation, storage, and networking functionality in a micro-cloud located outside the macro edge cloud 140. Including a micro edge cloud 130 at or near the arena 100 may situate at least the initial computing of video and other data closer to spectators at the venue, providing decreased latency, opportunities for increased security, and the ability to process data in real-time. The micro edge cloud 130 may provide coordination and control for the cameras 120. In addition, the micro edge cloud 130 may continuously run image detection and classification with deep learning tools to create occupancy grids within captured images and update or check an event parameters database. If the occupancy grid is very dense in a particular view or series of views and a pattern is recognized (e.g., a game play) as being of interest, the imaging may be forwarded for optimization by the macro edge cloud 140.

The macro edge cloud 140 may include one or more computing devices located at a data center and/or a distributed cloud network configured to communicate with the micro edge cloud 130 over a wired or wireless communication link 135. The macro edge cloud 140 may be configured to provide viewers in remote locations (e.g., at home or other venue providing video broadcast of an event) with video on-demand services in accordance with various embodiments.

Figure 1B:
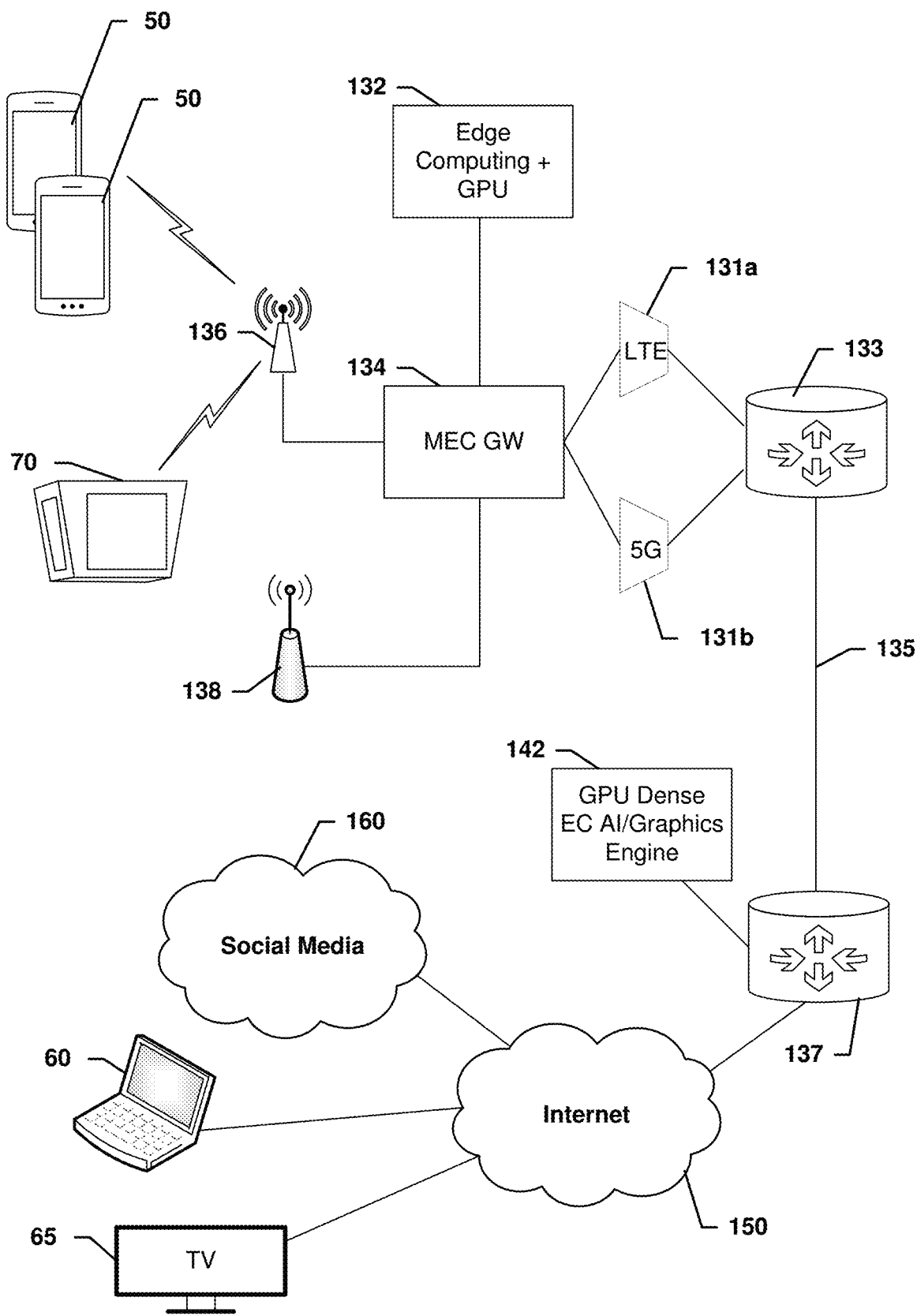
FIG. 1B is a schematic diagram conceptually illustrating a micro edge cloud and a macro edge cloud in accordance with various embodiments.

FIG. 1B illustrates an example of the data collection architecture that may be provided for delivering on-demand video viewing angles of an event at the arena 100. In particular, an edge computing and graphics processing unit (i.e., "Edge Computing+GPU") 132 may process images and other data received via a micro edge cloud gateway (MEC GW) 134. The MEC GW 134 may communicate with user viewing devices 50 or arena display devices (e.g., a jumbotron) 70 through a wireless access point 136. In addition, the MEC GW 134 may communicate with citizens broadband radio (i.e., CBRS)/real-time new radio base band unit (i.e., RT NR BBU) 138. Further, the MEC GW 134 may communicate with the macro edge cloud via a Long Term Evolution core (i.e., LTE) 131a or a 5G core (i.e., 5G) 131b., a micro edge router 133 and a macro edge router 137, linked by the communication link 135. The communication link 135 may be a 10 Gbps link (i.e., optical/wireless 5G) to provide a steady 10 Gbps stream from the venue.

On the macro edge cloud side of the architecture, the macro edge router 137 may connect the high-density GPU with electromagnetic compatibility artificial intelligence (i.e., GPU Dense EC AI) and graphics engine 142, which may be used for the more detailed image analysis and video rendering. In addition, the macro edge router 137 may couple the GPU Dense EC AI/Graphics Engine 142 to the Internet 150 to access social media accounts 160 and remote user viewing devices, such as through a mobile computing device (e.g., viewing device 60), home theatre system (e.g., viewing device 65—"TV"), or public viewing device.

Figure 2:
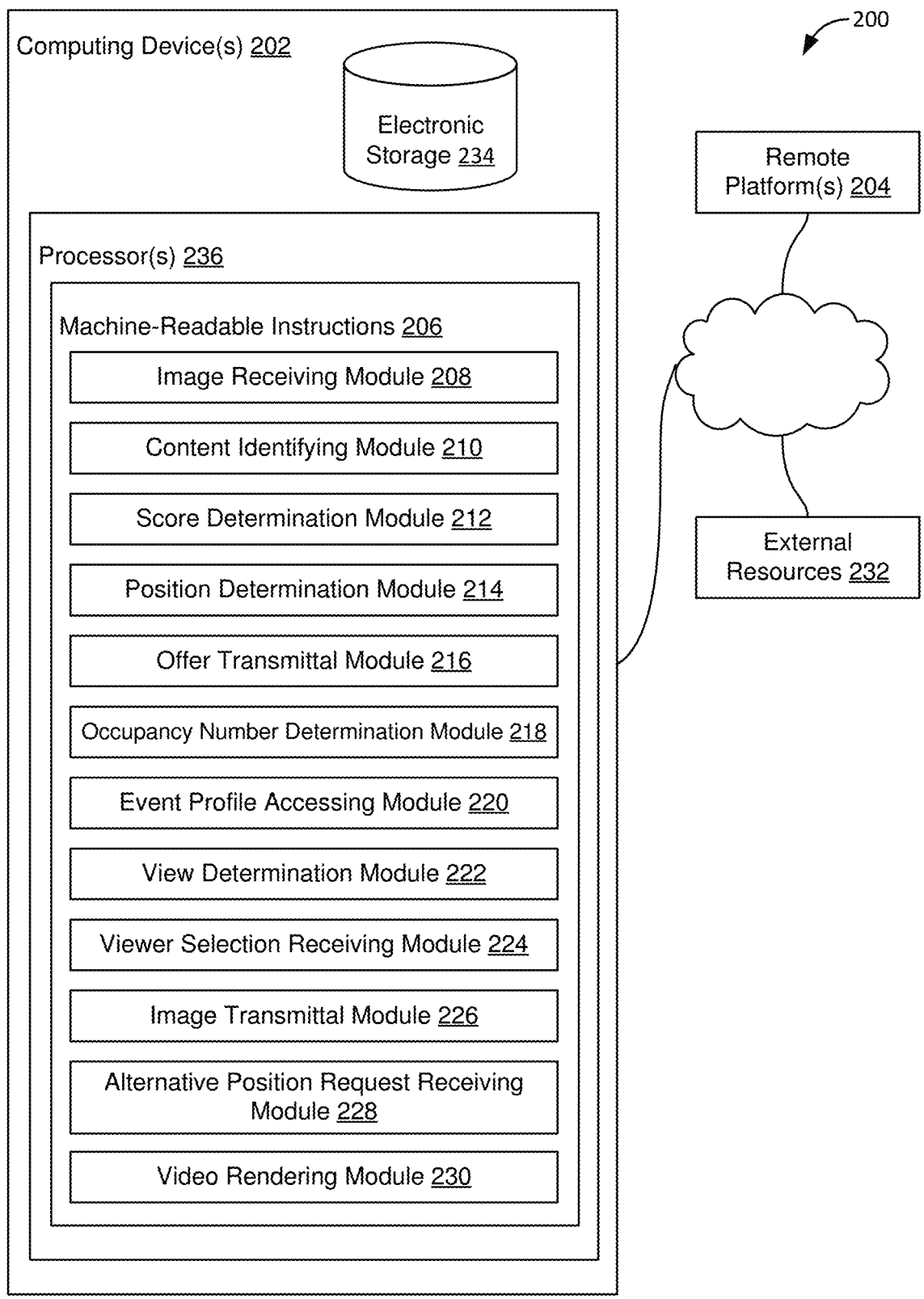
FIG. 2 is a component block diagram illustrating computing systems that may be configured to deliver on-demand video viewing angles of an arena at a venue in accordance with various embodiments.

FIG. 2 is a component block diagram illustrating computing system 200 configured for delivering on-demand video viewing angles of an arena at a venue in accordance with various embodiments. In some embodiments, the computing system 200 may include one or more computing platforms 202 and/or one or more remote platforms 204. With reference to FIGS. 1A-2, the computing platform(s) 202 may include an edge computing+GPU device (e.g., 132), a MEC GW (e.g., 134) and one or more core processors (e.g., 131a, 131b). Remote platform(s) 204 may include a GPU Dense EC AI/Graphics Engine (e.g., 142).

Computing platform(s) 202 may be configured by machine-readable instructions 206. Machine-readable instructions 206 may include one or more instruction modules. The instruction modules may include computer program modules. The instruction modules may include one or more of image receiving module 208, content identifying module 210, score determination module 212, position determination module 214, offer transmittal module 216, occupancy number determination module 218, event profile accessing module 220, view determination module 222, user selection receiving module 224, imaging transmittal module 226, user receiving module 228, image rendition module 230, and/or other instruction modules.

Image receiving module 208 may be configured to receive, at a processor of a computing device, images of an event taking place across a plurality of positions within the arena 100 from a series of cameras 120 surrounding the plurality of positions. The series of cameras 120 may be configured to capture images of each of the plurality of positions from at least three different viewing angles.

Content identifying module 210 may be configured to identify, by the processor analyzing the plurality of images, content of interest within the images. By way of non-limiting example, the content of interest may include an event participant, an event official, a primary event object, and/or arena landmarks.

Score determination module 212 may be configured to determine, by the processor, a score for each of the images based on the identified content of interest. The score for each of the video images may be determined from an aggregate of values identified as being associated with a particular portion of a video stream. Those values may each be associated with one or more different attributes that the video contains. For example, if the video image is determined to contain content of interest (e.g., event participant, an event official, a primary event object, or arena landmarks), that image may be assessed a higher value than if the same image did not contain that content of interest. In addition, if the image is determined to contain a threshold number of occupants (e.g., event participants and/or officials), the image may be assessed a higher value. Similarly, if an image is of a field position indicated by the user as being a preference (e.g., near a goal), that image may be assessed a higher score. In this way, the score determination module 212 may determine an aggregate score for each image.

Position determination module 214 may be configured to determine, by the processor, a highest-score position from the plurality of positions based on the determined score. The determined score for each position image may be a sum of all values associated with that position image. For example, the image of one position may receive a score summed from multiple values attributed to the image from content therein, such as a team/player, a field position, an image occupancy, special circumstances occurring during the event, and other parameters. The determined score may take into account a spectator's position in the arena (e.g., attempting to offer alternative views from the one from the spectator's seat) or an indication that the user is watching the event remotely (e.g., attempting to offer alternative views from the ones already offered by television broadcasters).

Offer transmittal module 216 may be configured to transmit, by the processor to a display device for viewing video of the event, an offer to view images of the highest-score position. The images of the highest-score position may be taken from a select viewing angle.

Occupancy number determination module 218 may be configured to determine an occupancy number for each of the plurality of positions. By way of non-limiting example, the occupancy number may correspond to a total number of event participants, event officials, and primary event objects identified within the respective images.

Event profile accessing module 220 may be configured to access an event profile to determine parameters for scoring each of the images. By way of non-limiting example, the event profile may include at least one identifier selected from a group consisting of event rules, event patterns, participants, participant group identifiers, or user preferences. Determining the score for each of the images may apply the event profile to the identified content for determining the highest-score position.

The view determination module 222 may be configured to determine at least one alternate view to the determined highest-score position. The at least one alternate view corresponds to images of the highest-score position from more than one different viewing angle than the select viewing angle. Determining the score for each of the images may use the primary viewing angle of the user to reduce the likelihood that images from the primary viewing angle will be offered for viewing in the transmitted offer to view images of the highest-score position. For example, there may be a high likelihood that a user wants to be presented with a viewing angle that is from an opposite side of the arena relative to that user's seat at the arena. Alternatively, user preferences may indicate the user prefers to be offered viewing angles from a center of the arena (i.e., a virtual position rendered by combining several views). Determining the score for each of the images may use the preferred viewing angle of the viewer to increase the likelihood that images from the preferred viewing angle will be offered for viewing in the transmitted offer to view images of the highest-score position.

The user selection receiving module 224 may be configured to receive, by the processor from the viewing device, a user selection corresponding to images of the highest-score position selected for viewing by the user.

The user selection receiving module 224 may be configured to receive, by the processor from the viewing device, a user selection corresponding to a replay of a past event moment for viewing by the user. The event profile may include a primary viewing angle of the user. The event profile may include a preferred viewing angle of the user. The past event moment was captured at a previous time that may be a predetermined interval from a live broadcast time of the event. Alternatively, or additionally, the user selection receiving module 224 may receive, by the processor from the viewing device, a user selection corresponding to a live-view of one of the offered viewing angles. Once the processor identifies the position associated with the user selection, the processor may direct the video rendering module 230 to render video of that position.

The imaging transmittal module 226 may be configured to transmit, by the processor to the viewing device 50, 60, 65, 70, images that correspond to the user selection. The imaging transmittal module 226 may also or alternatively be configured to transmit images of the alternate position. In addition, the imaging transmittal module 226 may be configured to transmit visual images, generally in the form of streaming video, that correspond to the replay of the past event moment.

The alternative position request receiving module 228 may be configured to receive, by the processor from the viewing device, a user request for video images of an alternate position, different from the determined highest-score position. The alternative position request receiving module 228 may also be configured to assess the user request to identify precisely which alternative position is associated with the received request. Once the processor identifies the alternative position, the processor may direct the video rendering module 230 to render video of the alternative position.

The video rendering module 230 may be configured to render, by the processor, video of the event based on a plurality of the received video images. The plurality of received video images were each captured from different viewing angles and the rendered video may be a combination of the plurality of received video images. In this way, a processor may stitch together elements of images from different viewing angles to generate a rendered video that looks like it was taken from a hybrid location between camera views. Transmitting the offer to view video of the highest-score position may include the images from the different viewing angles.

The video rendering module 230 may be configured to render, by the processor, video images of the event based on the plurality of received images. The rendered video images may include a close-up version of the plurality of received images.

Figure 3A:
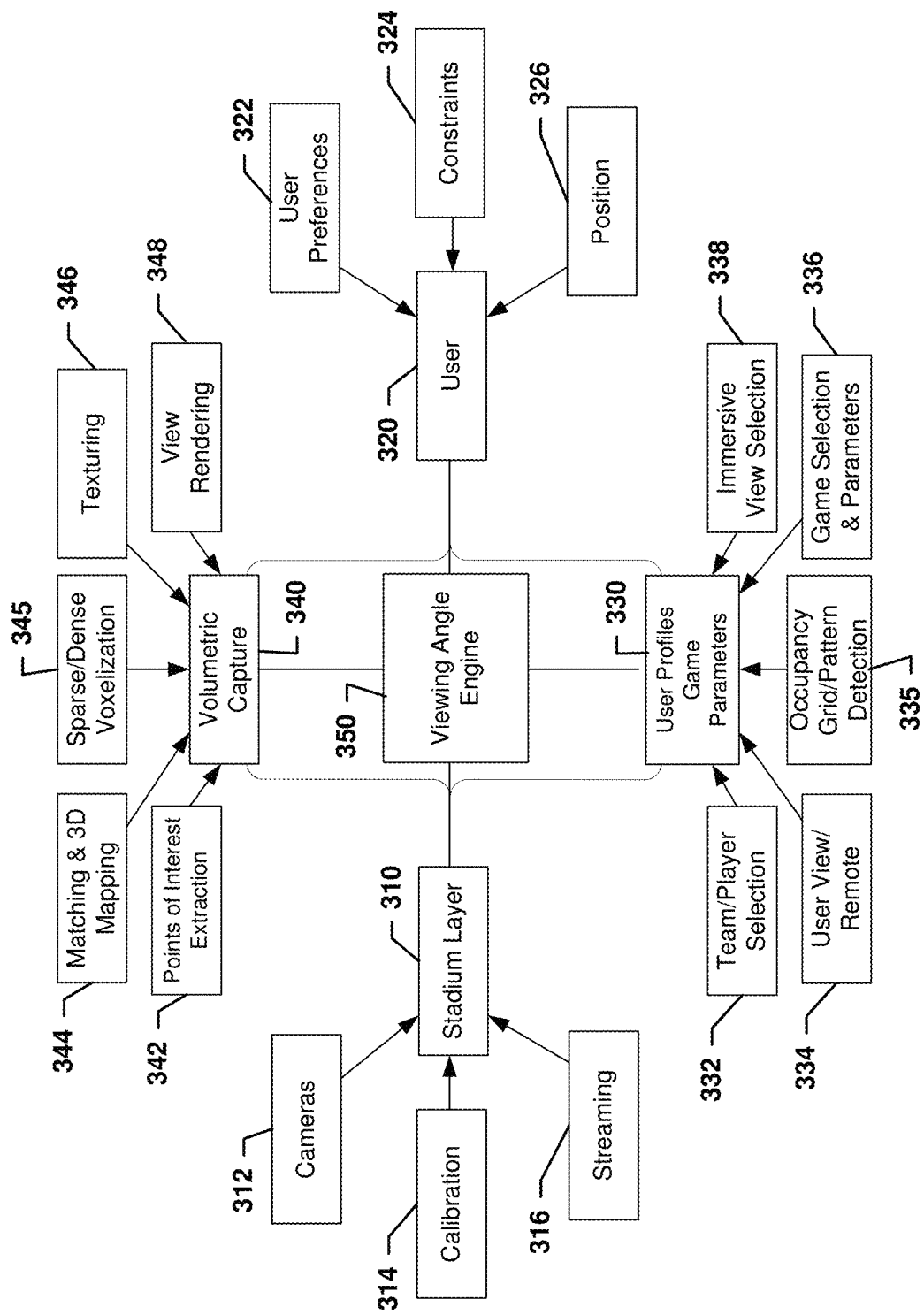
FIG. 3A is a diagram illustrating an example of a software architecture for implementing the delivery of on-demand video viewing angles of an arena at a venue in accordance with various embodiments.

FIG. 3A illustrates an example of a software architecture 300 including an on-demand video viewing angles engine 350 merging imaging data received from a stadium layer 310, a user layer 320, a user profiles game parameters layer 330, and a volumetric capture layer 340. With reference to FIGS. 1A-3A, the computing system (e.g., 200) may implement the software architecture 300 for delivering on-demand video viewing angles of an arena (e.g., 100) including a field (e.g., 110). In various embodiments, layers in software architecture 300 may form logical connections with corresponding layers in software of the computing system. The software architecture 300 may be distributed among one or more processors (e.g., 236). While illustrated with respect to one on-demand video viewing angles engine 350, the software architecture 300 may include multiple protocol stacks, each of which may be associated with a different computing device (e.g., two protocol stacks associated with two computing devices, respectively).

The stadium layer 310 may include various sublayers including a camera layer 312, a calibration module layer 314, and a streaming module layer 316. The camera layer 312 and calibration module layer 314 may include camera positioning and calibration functionality for detecting the orientation and intersection regions between imaging frames and viewing cones. Pre-mapped points may help the streaming module layer 316 infer quickly which camera views to relay for two-dimensional (2D) extraction and texture filling. The streaming module layer 316 may package and transmit (i.e., relay) aggregated views with best codec, bit rate, resolution, etc. to the on-demand video viewing angles engine 350 via the stadium layer 310.

The user layer 320 may include various sublayers including a user preferences layer 322, a constraints layer 324, and a position layer 326. The user preferences layer 322 may maintain parameters for identifying content of interest set by or on behalf of a user. For example, the user may prefer particular viewing angles, a particular team, a particular player, etc. and indicate as a user preference that such parameters be given more weight when determining whether content qualifies as content of interest. For example, the user may himself/herself play a position in the sport that is being viewed. For example, if the user is a goalie, then the user may prefer viewing angles that depict the views as seen by the goalie. Further, the user may have a favorite player and wish to view angles from that favorite player's point of view. Otherwise, the user may prefer to view only an offensive or defensive point of view. In addition, the user preferences layer 322 may include parameters used to determine how frequently new views may be offered to the user, the number of views offered, resolution quality of the offered images, and more. The constraints layer 324 may maintain parameters that limits delivery of streaming video, such as network or bit rate constraints. The position layer 326 may maintain information regarding a user's (spectator's) position within the arena 100 or whether the user is viewing from a remote location (e.g., from a remote venue on television or other viewing device). A user's seat will define a particular viewing angle, which means that as a user that spectator would probably like to be offered views from other viewing angles. Similarly, as a remote viewer, the user may prefer to be offered views that are different from those presented by media broadcasters.

The user profiles game parameters layer 330 may include various sublayers including a team/player selection layer 332, a user view/remote layer 334, an occupancy grid/pattern detection layer 335, a game selection & parameters layer 336, and an immersive view selection layer 338. A processor may access the user profiles game parameters layer 330 to implement functions, such as the event profile accessing module (e.g., 220), described above. The team/player selection layer 332 may include information used to identify each team and player within the arena. Similarly, information pertaining to game officials may be maintained in the team/player selection layer 332. The user view/remote layer 334 may include information about spectator positions in the arena or views provided to remote viewers (e.g., watching on television or mobile applications). The spectator positions may include detailed information about areas, sections, or levels in which spectators are seated for a particular event at a venue. In this way, offered views may be generalized to areas or sections of the venue. Alternatively, offered views may be customized to provide rich diverse videos for small viewing areas/sections or even a particular seat within the venue. The occupancy grid/pattern detection layer 335 may maintain parameters used for defining whether or under what circumstances a cluster of players is considered content of interest or whether particular patterns of movement match to a game play for determining content of interest. The occupancy grid/pattern detection layer 335 may contain the rules used for determining the occupancy number of a particular image, such as by the occupancy number determination module (e.g., 218). The game selection & parameters layer 336 may maintain information pertaining to rules by which the event is run (e.g., game rules), which may constrain or guide the determination about content of interest. For example, after a whistle blows in football or basketball the action on the field 110 or court is less significant. The immersive view selection layer 338 may store and use the user's selection regarding an offer to view images of a highest-score position taken from a select viewing angle. The immersive view selection layer 338 may direct a processor to initiate delivery of a particular video stream.

The volumetric capture layer 340 may include various sublayers including a points of interest extraction layer 342, a matching and three-dimensional (3D) mapping layer 344, a sparse/dense voxelization layer 345, a texturing layer 346, and a few rendering layer 348. The points of interest extraction layer 342 retrieves points of interest from simultaneous frames from different cameras. The matching and three-dimensional (3D) mapping layer 344 matches key points of interest and estimates a 3D mapping between the matched key points of interest. The sparse/dense voxelization layer 345 creates sparse 3D voxels of the arena and the event participants therein. This enable the transition from 2D pixels to a 3D point cloud space from which viewing angles may be rendered. The texturing layer 346 retrieves pixel textures from a surface plane of the 3D voxelized space. The few rendering layer 348 positions different virtual camera positions in the 3D space in order to create different videos that may be offered to a user.

While the software architecture 300 may provide functions to transmit data through physical media, the software architecture 300 may further include at least one host layer to provide data transfer services to various applications in the computing device. In some embodiments, application-specific functions provided by the at least one host layer may provide an interface between the software architecture and a general-purpose processor.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include a hardware interface between a physical layer and communication hardware (e.g., one or more radio frequency (RF) transceivers).

Figure 3B:
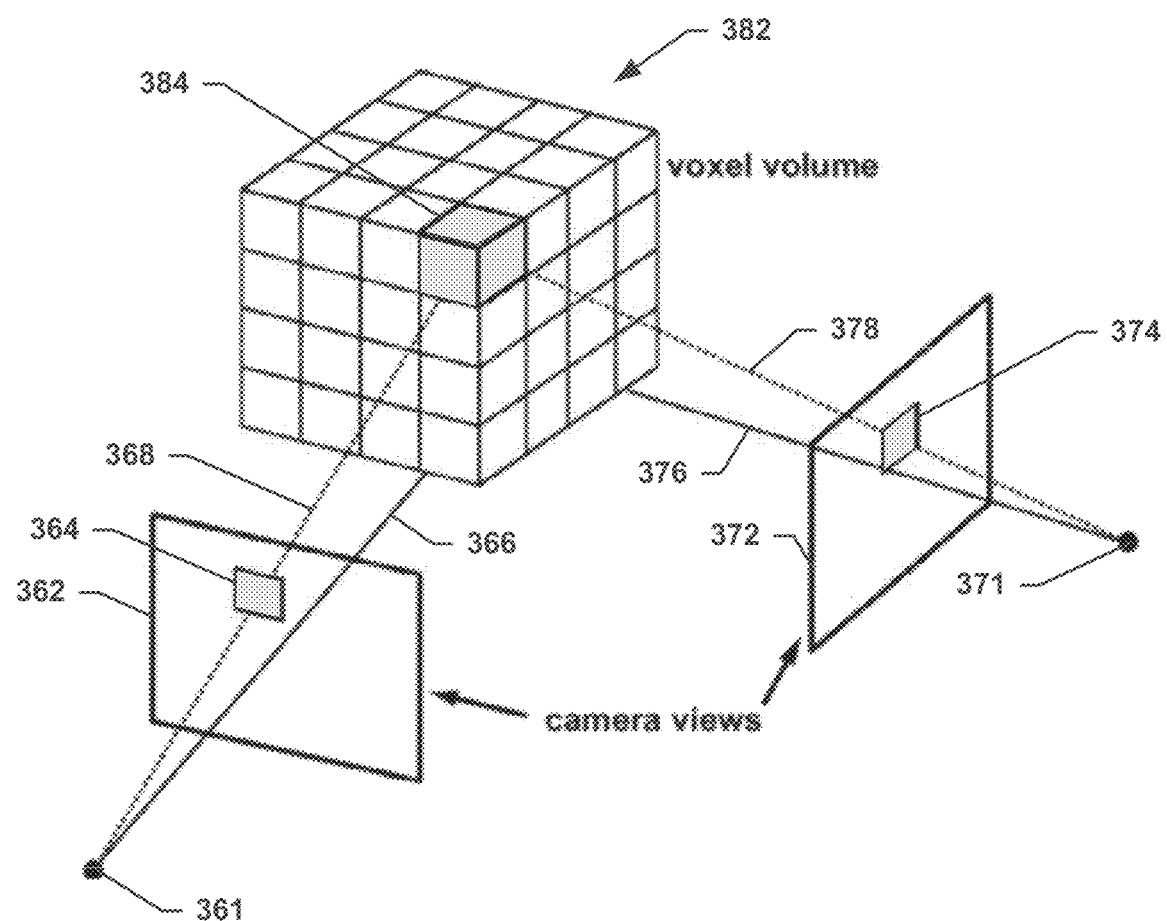
FIG. 3B is a schematic representation of voxelization and texturing from different camera views in accordance with various embodiments.

FIG. 3B illustrates a schematic representation of voxelization and texturing using different camera views, in accordance with various embodiments. Voxelization refers to the process of determining depth (i.e., real-world distances/dimensions) associated with an image, using a set of cross-sectional images within a designated voxel volume defined by a volumetric dataset. These cross-sectional images are made up of pixels and are each virtual slices of the voxel volume. Various embodiments use voxelization to determine an accurate depth of objects (e.g., event participants, event officials, event objects, arena landmarks, etc.) in the images forming a video stream. In addition, an analysis of the video images may be used to identify each object based on its actual position within a 3D reference space of the venue. With reference to FIGS. 1A-3B, the computing system (e.g., 200) may isolate pixels 364, 374, which are 2D elements from different camera views 362, 364. Each of the different camera views 362, 364 may be of the same voxel volume 382, which is a 3D space. The different camera views 362, 364 originate from different view-points 361, 371. A processor may use depth recognition to compile voxels 384 within the voxel volume 382. The depth recognition may take into account known or estimated horizontal distances 366, 376 between the respective view-points 361, 371 and the voxel volume 382, as well as line-of-sight distances 368, 378 between the respective view-points 361, 371 and respective target voxels 384 to compile images of the voxel volume 382. Thus, each target voxel 384 is also a 3D element within the voxel volume 382.

Figure 4:
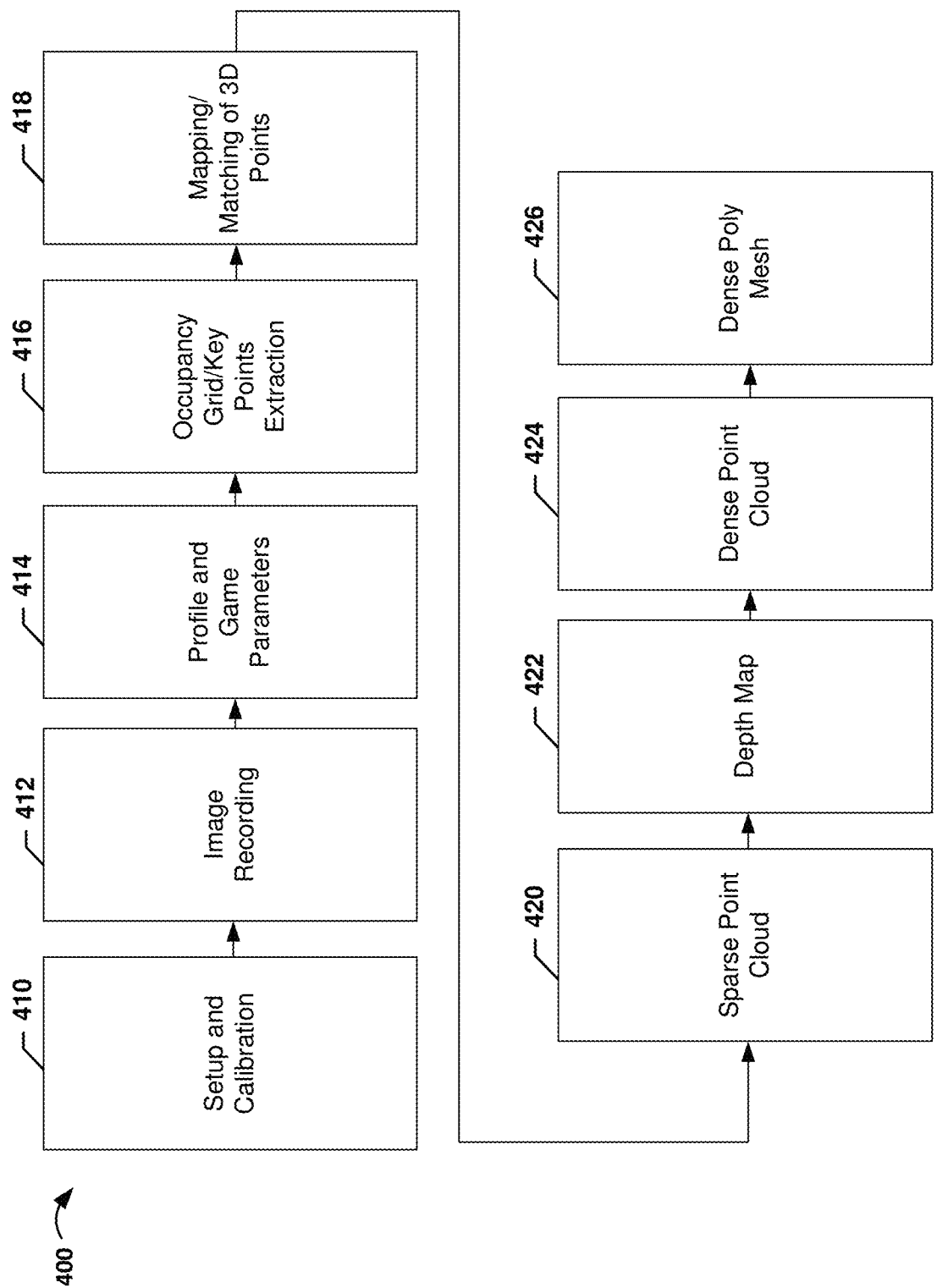
FIG. 4 illustrates operations of a method for setting up and operating a system for delivering on-demand video viewing angles of an arena at a venue in accordance with various embodiments.

FIG. 4 illustrates operations of a method 400 that may be implemented for setting up and operating a system for delivering on-demand video viewing angles of an arena 100. In particular, the method 400 may provide a process of voxelization and texturing in accordance with various embodiments. The operations of the method 400 presented below are intended to be illustrative. In some embodiments, the method 400 may be accomplished with one or more additional operations not described, and/or without one or more of the operations discussed. In some embodiments, method 400 may be implemented in one or more processors (e.g., a digital processor, an analog processor, a digital circuit designed to process information, an analog circuit designed to process information, a state machine, and/or other mechanisms for electronically processing information). The one or more processors may include one or more devices executing some or all of the operations of the method 400 in response to instructions stored electronically on an electronic storage medium. The one or more processors may include one or more devices configured through hardware, firmware, and/or software to be specifically designed for execution of one or more of the operations of the method 400. For example, with reference to FIGS. 1A-4, the operations of the method 400 may be performed by a processor of the micro edge cloud (e.g., 130) or the macro edge cloud (e.g., 140).

With reference to FIG. 4, in block 410 the cameras (e.g., 120) may be setup at the arena 100 to ensure events in the arena may be properly captured. In this way, the cameras 120 may be positioned and aimed accordingly. In block 412, each camera may start recording images and the raw images from each camera, which may be recorded at over 30 frames per second (fps), but preferably recorded at 60 fps, may be received at the micro edge cloud (e.g., 130) for processing.

In block 414, the user profile and game parameters (e.g., from the user layer 320 and the user profiles game parameters layer 330) may be loaded into a rules engine for the analysis of the raw images.

In block 416, the selection settings from block 414 may be applied to the raw images collected in block 412 for performing occupancy grid or key points extraction. In block 416, a processor analyzing the images may create occupancy grids that identify occupants (i.e., players, officials, and/or primary game objects), as well as arena landmarks (i.e., field lines or goals), in numerous positions within the arena 100 to identify what objects (players, officials, primary game objects, field lines, goals) occupies each image. In this way, the key points from each image may be extracted.

In block 418, a processor may map/match the key points extracted in block 416 with color and shape information contained within the images.

In block 420, a processor may create a sparse point cloud of the space that is above the ground level, which includes an initial representation of the objects, such as event participants (i.e., players) and game officials (i.e., referees or umpires). In creating a sparse point cloud the processor may determine the actual shapes and dimensions of each object, regardless of how far away that object is from the camera capturing the video images. Using 3D scanning techniques, the processor may measure points on the external surfaces of the objects in order to map the shapes and dimensions thereof.

In block 422, a processor may create a depth map, which includes depth information about the participants and game officials. The depth information may be used to make sense of the distance between occupants (i.e., players and/or game officials) and their position within the 3D space of the venue.

In block 424, a processor may use the sparse point cloud information from block 420 and the depth map information from block 422 to create a dense point cloud representation of object s with greater detail. The more detailed dense point cloud representation of each object my define a dense and continuous 3D shape for texturing.

In block 426, a processor may use the created dense point cloud representation to generate a continuous 3D shape referred to as a dense poly mesh. Each object, defined by a dense poly mesh, will be attributed textures from the multiple camera views used to create an image of the object. The texturing process may include attributing colors and shades thereof to every area of the generated 3D objects.

In some embodiments, the processor may repeat the operations in blocks 410-426 to periodically or continuously set up and operate a system for delivering on-demand video viewing angles of an arena at a venue until a break in the action, the event is over, or some other defined point.

Figure 5A:
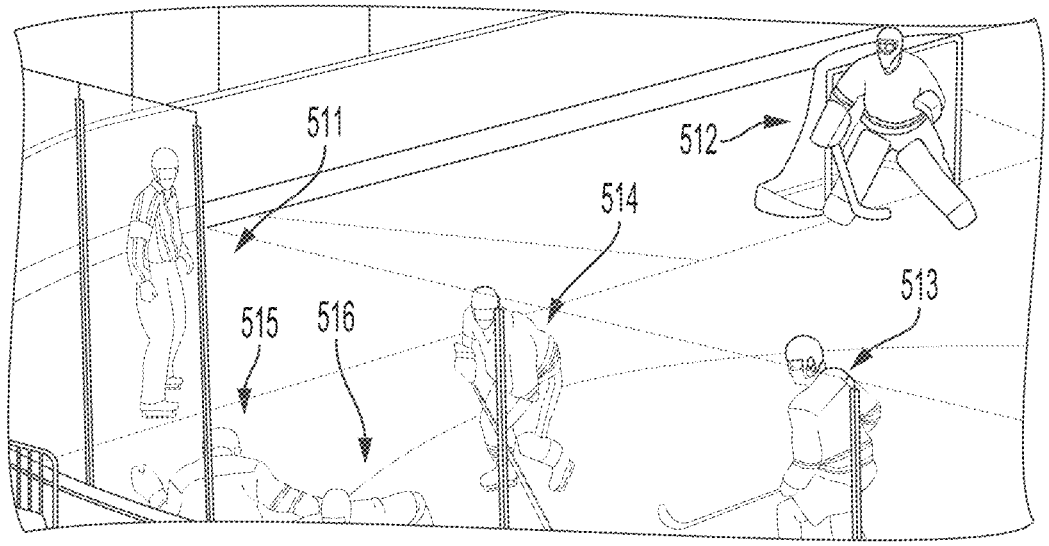
FIGS. 5A-5C illustrate example images of a viewing angle, occupancy grid analysis, and alternative viewing angle in accordance with various embodiments.
Figure 5B:
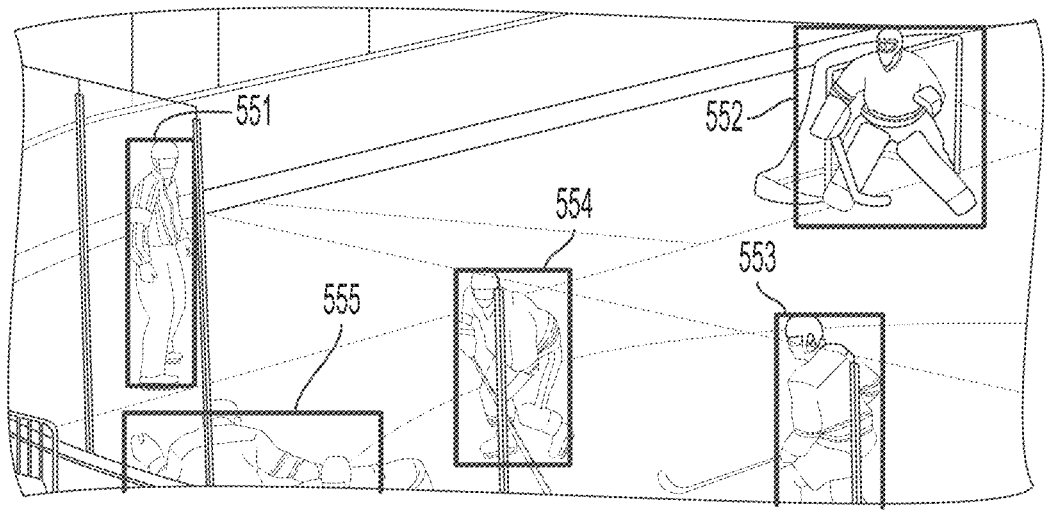
Figure 5C:
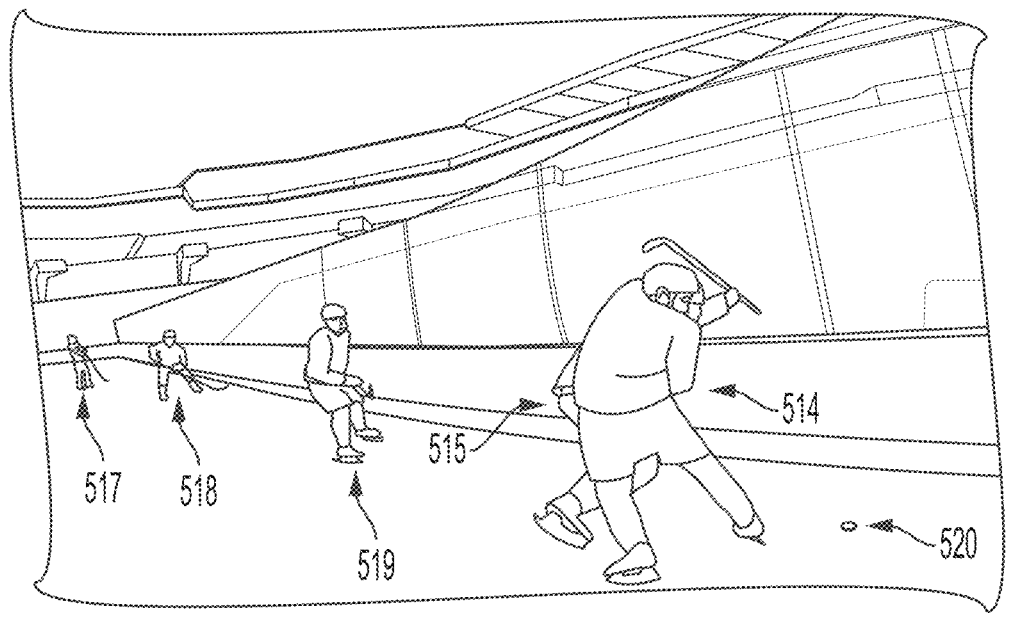

FIGS. 5A-5C illustrate an example of an occupancy grid analysis for determining an occupancy number of a position from a particular viewing angle and a corresponding alternative viewing angle for the same position.

FIG. 5A illustrates an image from a hockey game in progress. For example, within the image, a group of 5 occupants 511, 512, 513, 514, 515, 516 have converged, which includes a referee 511, a goalie 512, two players from the goalie's team 514, 516, and two players from the opposing team 513, 515, meaning the image has a relative high occupancy. The threshold for how many players and officials in one image qualifies as being "high occupancy" may be specific to the sport, the league, the arena or other factors. This threshold may be stored in the game selection and parameters layer (e.g., 336) of the viewing angle engine (e.g., 350) and later used by a processor to score each image to determine whether the threshold is reached. Thus, a processor may access an event profile to determine parameters for scoring each of the images. The event profile may then be applied during the image analysis to determine the score for each of image based on the identified content for determining whether the image has captured a highest-score position.

FIG. 5B illustrates the image shown in FIG. 5A after image point mapping and key point extraction (described above with regard to FIG. 4). In particular, five of the six occupants may be identified and areas within the image associated with each occupant may be tagged. This includes a referee area 551, a goalie area 552, a first player area 554 from the goalie's team, and second and third player areas from the other team 553, 555. In this example image, the second player 516 from the goalie's team is not clearly visible and may not have been recognized during the image analysis. In this instance, which is for a national hockey league event, a threshold occupancy may be three (3) since in hockey when three players or two players and a referee converge there is a good chance something interesting may occur. Since the image illustrated in FIGS. 5A and 5B possesses a threshold number of occupants, it may be considered a highest-score position for viewing. Accordingly, a processor may offer this image and/or other images from this viewing angle to a viewer for display. Additionally, or alternatively, the processor may determine and offer at least one alternate view of the determined highest-score position. The at least one alternate view may correspond to one or more images of the highest-score position from more than one different viewing angle.

FIG. 5C illustrates another image, focused on the same location as shown in FIGS. 5A and 5B, but from a very different viewing angle. In FIG. 5C two of the players 514, 515 from FIGS. 5A and 5B are visible, as well as a new referee 517 and two new players 518, 519. In addition, in FIG. 5C a primary event object 520 is visible; namely the hockey puck. In most sports, much of the most significant action revolves around the primary event object, thus the presence of a primary event object (e.g., the hockey puck) in an image may score an image higher in terms of the occupancy detection threshold. Thus, since this additional image also meets the occupancy threshold in terms of players, but also includes the primary event object (i.e., the hockey puck), the processor may transmit an offer to view images of this highest-score position from this different viewing angle.

Figure 6A:
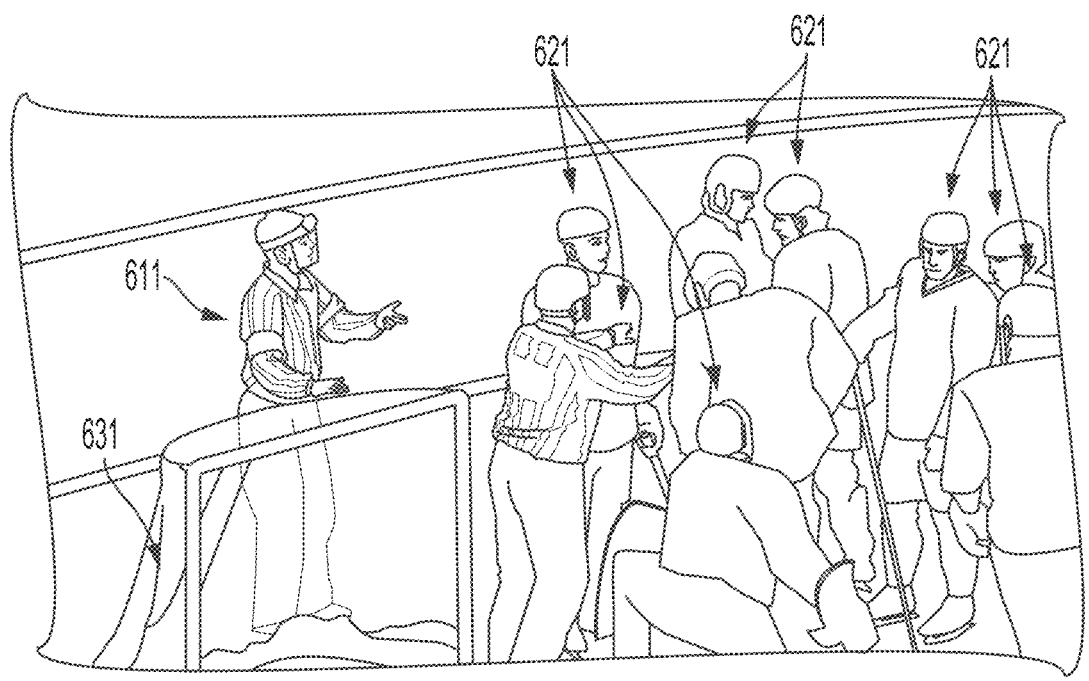
FIGS. 6A-6C illustrate additional example images of a viewing angle, occupancy grid analysis, and alternative viewing angle in accordance with various embodiments.
Figure 6B:
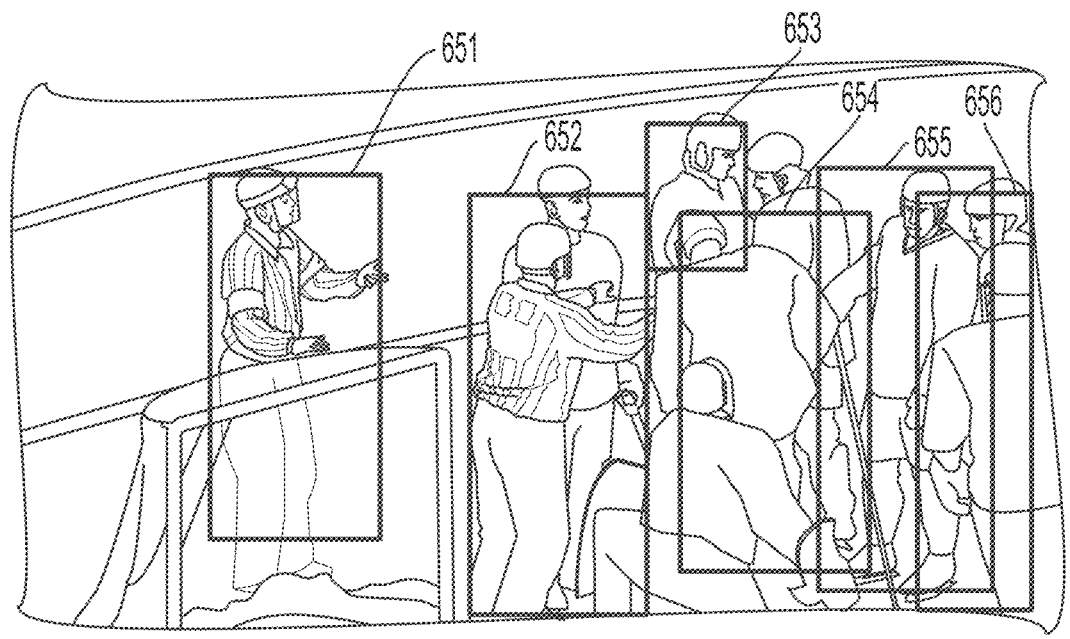
Figure 6C:
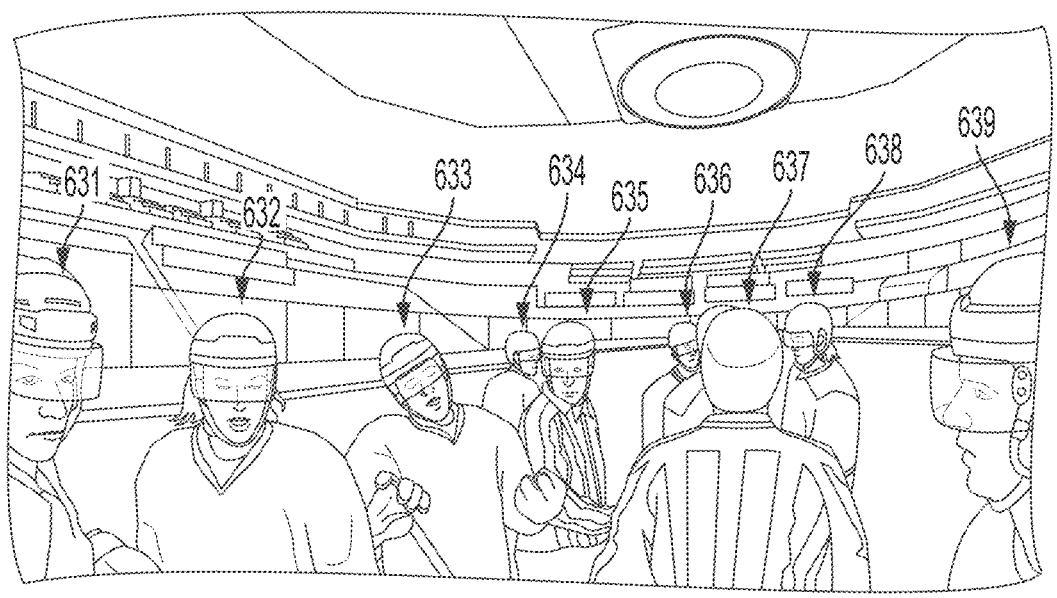

FIGS. 6A-6C illustrate another example of an occupancy grid analysis for determining an occupancy number of a position from a particular viewing angle and a corresponding alternative viewing angle for the same position.

FIG. 6A illustrates another image from the hockey game in progress. Within this image, a referee 611 and a cluster 621 of 9 occupants is visible near the goal 631. The cluster 621 alone exceeds the occupancy threshold. Thus, a processor may determine this image corresponds to a highest-score position since it contains context of interest.

FIG. 6B illustrates the image shown in FIG. 6A after image point mapping and key point extraction (described above with regard to FIG. 4). In particular, six of the 10 occupants have been identified and areas within the image associated with each occupant tagged. This includes a first referee area 651, a second referee 652, only two player areas 652, 655 from the goalie's team, and three player areas from the opposing team 653, 654, 656. In this example image, the goalie and at least two other players were not recognized during the image analysis. Since this image has a threshold number of occupants, it may be considered a highest-score position for viewing. Accordingly, a processor may offer this image and/or other images from this viewing angle to a viewer for display. Additionally, or alternatively, the processor may determine and offer at least one alternate view of the determined highest-score position. The at least one alternate view may correspond to one or more images of the highest-score position from more than one different viewing angle.

FIG. 6C illustrates another image, focused on the same location as shown in FIGS. 6A and 6B, but from a very different viewing angle and zoomed-in. In FIG. 6C the referees 635, 637 and several players 631, 632, 633, 634, 636, 638, 639 are much more clearly visible and identifiable. Thus, considering this other image also significantly exceeds the occupancy threshold in terms of players, the processor may transmit an offer to view images of this highest-score position from this different viewing angle.

Figure 7A:
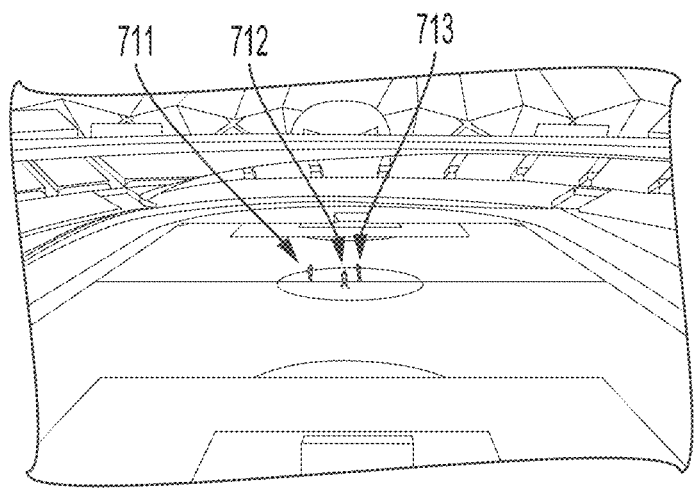
FIGS. 7A-7C illustrate examples images of viewing angles for occupancy grid analysis and alternative viewing angle determinations in accordance with various embodiments.
Figure 7B:
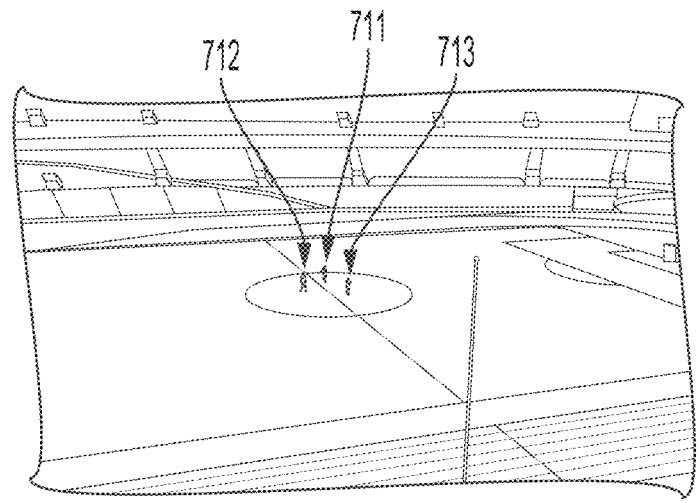
Figure 7C:
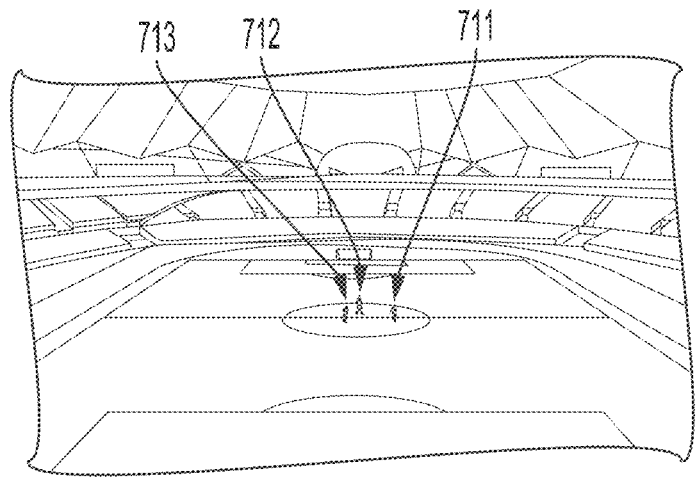

FIGS. 7A-7C and 8A-8D illustrate a further example of an occupancy grid analysis for determining an occupancy number of a position from more than one viewing angle and alternative views to offer a user. In particular, FIGS. 7A-7C illustrate zoomed-out images of a soccer field with only three players 711, 712, 713 visible in the center ring (i.e., images in which the soccer field and players seem smaller and further away from the viewer's perspective). In soccer a grouping of three players may be considered a threshold number for an occupancy threshold of a position (i.e., the area in the center ring). While FIGS. 7A-7C each have an unobstructed view of the three players 711, 712, 713, from different viewing angles, the distance of the view, because of the zoomed-out nature of the images, makes it difficult to tell what is happening. An image analysis may detect that the proportionate size of the players 711, 712, 713 relative to the rest of the image or the arena is below a size threshold and determine these images are not preferred images. Thus, the processor may determine whether one or more alternate views of this position may be preferred views. The one or more alternate views may correspond to one or more images of this position with a more close-up view.

Figure 8A:
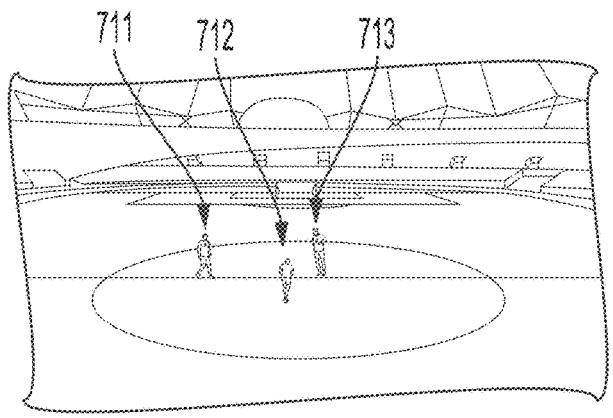
FIGS. 8A-8D illustrate examples images of alternative views of the viewing angles in FIGS. 7A-7D, as well as an alternative viewing angle in accordance with various embodiments.
Figure 8B:
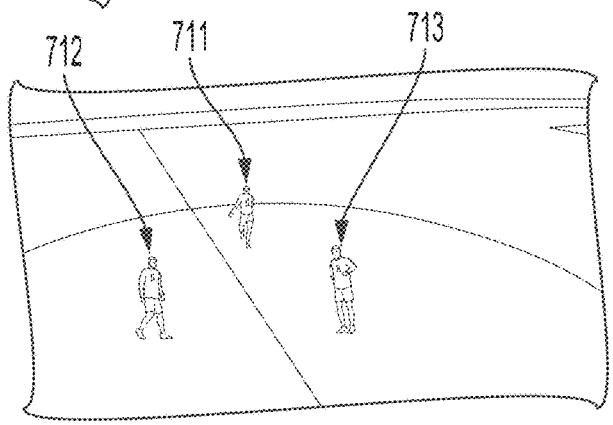
Figure 8C:
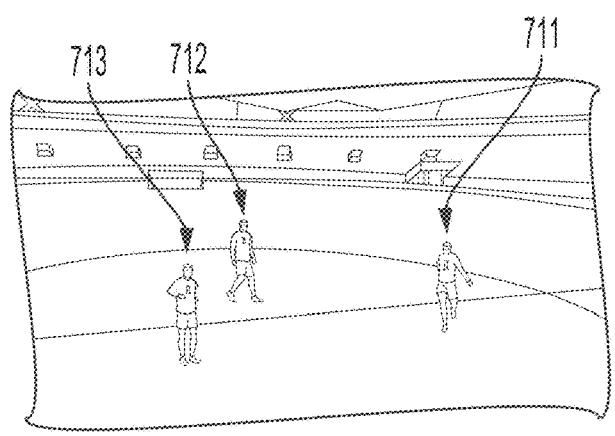

FIGS. 8A-8C illustrate close-up images of the soccer field, relative to those shown in FIG. 7A-7C, with the same three players 711, 712, 713 visible in the center ring. The image analysis may detect that the proportionate size of the players 711, 712, 713 relative to the rest of the image or the arena is now within a size threshold and determine these images are preferred images.

Figure 8D:
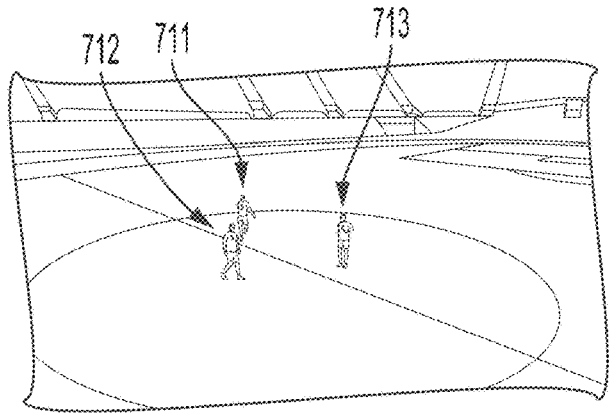

FIG. 8D illustrates another image, focused on the same location as shown in FIGS. 8A-8C, but from a different viewing angle. FIG. 8D may provide a vantage point different from a spectator's seat (i.e., a select user's point of view) or some other element that corresponds to a user preference of the select user. Thus, considering the vantage point of a select user or the other user preferences for the select user, the processor may transmit an offer to view this image of this highest-score position for that select user from this close-up view with a different viewing angle.

Figure 9:
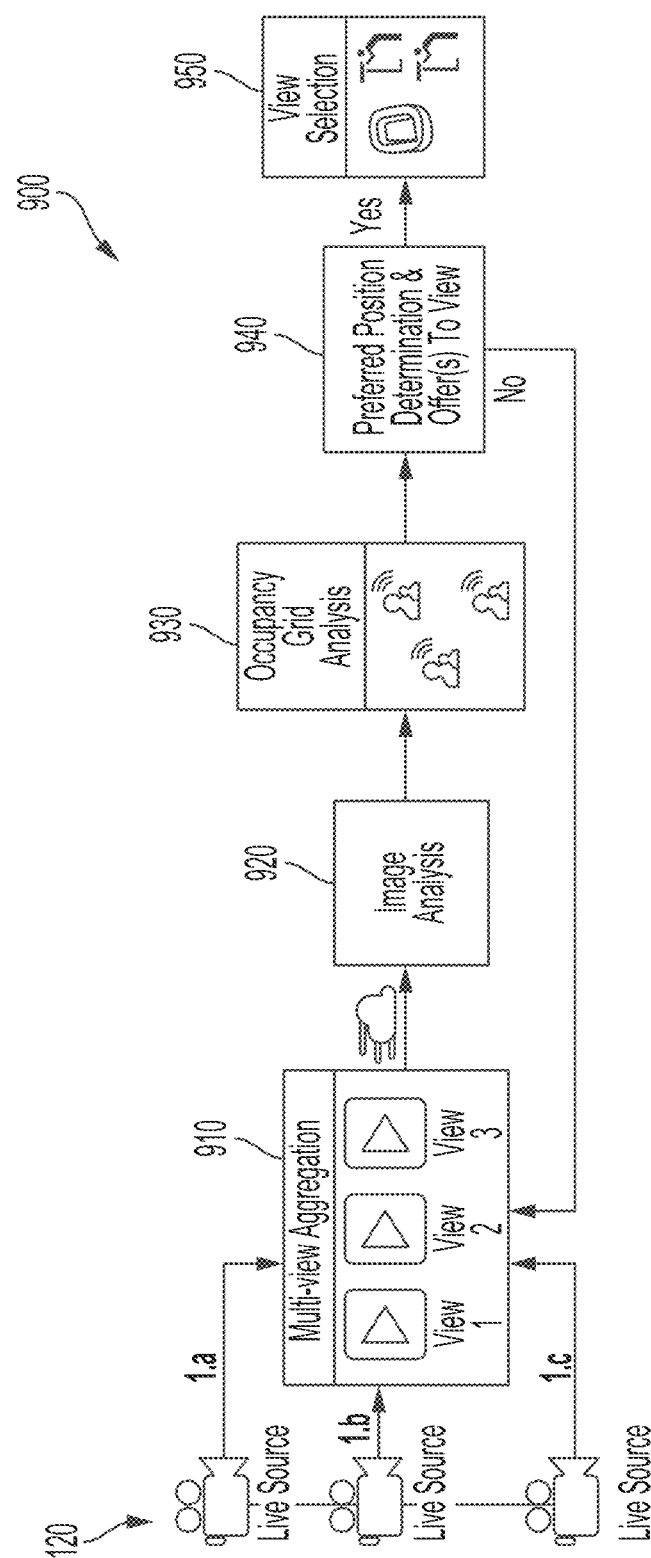
FIG. 9 illustrates operations of a method for operating a system for delivering on-demand video viewing angles of an arena at a venue in accordance with various embodiments.

FIG. 9 illustrates operations of a method 900 that may be implemented for operating a system for delivering on-demand video viewing angles of an arena 100. The operations of the method 900 presented below are intended to be illustrative. In some embodiments, the method 900 may be accomplished with one or more additional operations not described, and/or without one or more of the operations discussed. In some embodiments, method 900 may be implemented in one or more processors (e.g., a digital processor, an analog processor, a digital circuit designed to process information, an analog circuit designed to process information, a state machine, and/or other mechanisms for electronically processing information). The one or more processors may include one or more devices executing some or all of the operations of the method 900 in response to instructions stored electronically on an electronic storage medium. The one or more processors may include one or more devices configured through hardware, firmware, and/or software to be specifically designed for execution of one or more of the operations of the method 900. For example, with reference to FIGS. 1A-9, the operations of the method 900 may be performed by a processor of the micro edge cloud (e.g., 130) or the macro edge cloud (e.g., 140).

With reference to FIG. 9, in block 910, a processor may receive real-time (i.e., live source) video streams from one or more cameras 120, which the processor may aggregate and prepare for content analysis. In this way, the processor may perform image processing elements, such as frame selection, skipping and re-sizing of images (e.g., open source computer vision-- OpenCV), image tiling and kernels and filters initialization (e.g., using CUDA/C++ or similar programming model/tool).

In block 920, the processor may analyze the images in the real-time video stream. The processor may use deep learning, which is part of a broader family of machine learning methods based on artificial neural networks. This deep learning may be supervised, semi-supervised, or unsupervised. The deep learning may be applied to frameworks for participants (i.e., players), officials, and primary event objects (e.g., the game ball or puck). Such frameworks may define weights, cony, max pooling, activation, CFG, Mixed MobileNet-SSd and MobileNetSSD, CUDA, Caffe, OpenCV/OpenGI (i.e., for neural networks for GPU's CUDA and Caffe, Darknet (i.e., for graphs Neural Networks), MObilenetw, or other publicly known/open source frameworks for image processing.

In block 930, the processor may perform an occupancy grid analysis, which may include matching or classifying the identified occupants or event objects per camera view (e.g., using the occupancy grid/pattern detection layer 335). The matched/classified occupants may then be examined to determine whether the image(s) meet an occupancy grid threshold. Objects such as event participants (i.e., players), officials, and other elements within the analyzed video images may be identified in order to determine whether any particular volumetric spaces qualify as containing content of interest. In particular, the processor may use a threshold number (e.g., two players and one referree) of objects (i.e., occupants) to determine whether a given volumetric space qualifies as containing content of interest. The threshold may be set by system defaults and/or it may take into account user profiles and game parameters (e.g., using the user profiles and game parameters layer 330).

In determination block 940, the processor may determine whether the analyzed images depict a highest-score position for a select user. If a highest-score position for the select user is depicted, the processor may offer a view of those images (i.e., as part of a video stream) to that select user for selection. In making this determination, the processor may check any relevant databases to decide whether or not to trigger volumetric capture of the video feed from this preferred view. In response to the processor determining the analyzed image of the position does not include an interesting view, pattern, or play (i.e., determination block 940="No"), the processor may return to block 910 to receive more real-time video streams from the one or more cameras 120. In response to the processor determining the analyzed image of the position does include an interesting view, pattern, or play (i.e., determination block 940="Yes"), the processor may offer, to one or more users, the video feed for viewing. In this way, once the processor determines that the analyzed image of the position includes an interesting view, the processor may render views associated with that position from one or more angles, which views may be offered for viewing.

In block 950, the one or more users may be presented with the offer to view, generated in block 940, and the one or more users may make a selection as to which vantage point the users wish to view. Optionally, in block 950 or as a separate block between block 940 and 950 (not illustrated), the processor may forward the analyzed images to the macro edge cloud for further processing. This may allow image rendering of virtual views (rendered by combining elements of three views from different viewing angles), non-virtual views, or other complex processing to be done by the additional resources available in the macro-edge cloud. Once the user makes a selection as to which view he/she wants, the appropriate video stream may be transmitted to that user at a display device.

In some embodiments, the processor may repeat the operations in blocks 910-950 to periodically or continuously operate a system for delivering on-demand video viewing angles of an arena at a venue until a break in the action, the event is over, or some other defined point.

FIGS. 10A, 10B, 10C, 10D, 10E, 10F, 10G, 10H, and/or 10I illustrate operations of methods 1000, 1001, 1002, 1003, 1004, 1005, 1006, 1007, and 1008 for delivering on-demand video viewing angles of an arena at a venue in accordance with various embodiments. The operations of methods 1000, 1001, 1002, 1003, 1004, 1005, 1006, 1007, and 1008 presented below are intended to be illustrative. In some embodiments, methods 1000, 1001, 1002, 1003, 1004, 1005, 1006, 1007, and 1008 may be accomplished with one or more additional operations not described, and/or without one or more of the operations discussed. Additionally, the order in which the operations of methods 1000, 1001, 1002, 1003, 1004, 1005, 1006, 1007, and 1008 are illustrated in FIGS. 10A, 10B, 10C, 10D, 10E, 10F, 10G, 10H, and/or 10I and described below is not intended to be limiting.

In some embodiments, methods 1000, 1001, 1002, 1003, 1004, 1005, 1006, 1007, and 1008 may be implemented in one or more processors (e.g., a digital processor, an analog processor, a digital circuit designed to process information, an analog circuit designed to process information, a state machine, and/or other mechanisms for electronically processing information). The one or more processors may include one or more devices executing some or all of the operations of methods 1000, 1001, 1002, 1003, 1004, 1005, 1006, 1007, and 1008 in response to instructions stored electronically on an electronic storage medium. The one or more processors may include one or more devices configured through hardware, firmware, and/or software to be specifically designed for execution of one or more of the operations of methods 1000, 1001, 1002, 1003, 1004, 1005, 1006, 1007, and 1008. For example, with reference to FIGS. 1-10A, 10B, 10C, 10D, 10E, 10F, 10G, 10H, and/or 10I, the operations of the methods 1000, 1001, 1002, 1003, 1004, 1005, 1006, 1007, and 1008 may be performed by a processor of the micro edge cloud (e.g., 130) or the macro edge cloud (e.g., 140).

Figure 10A:
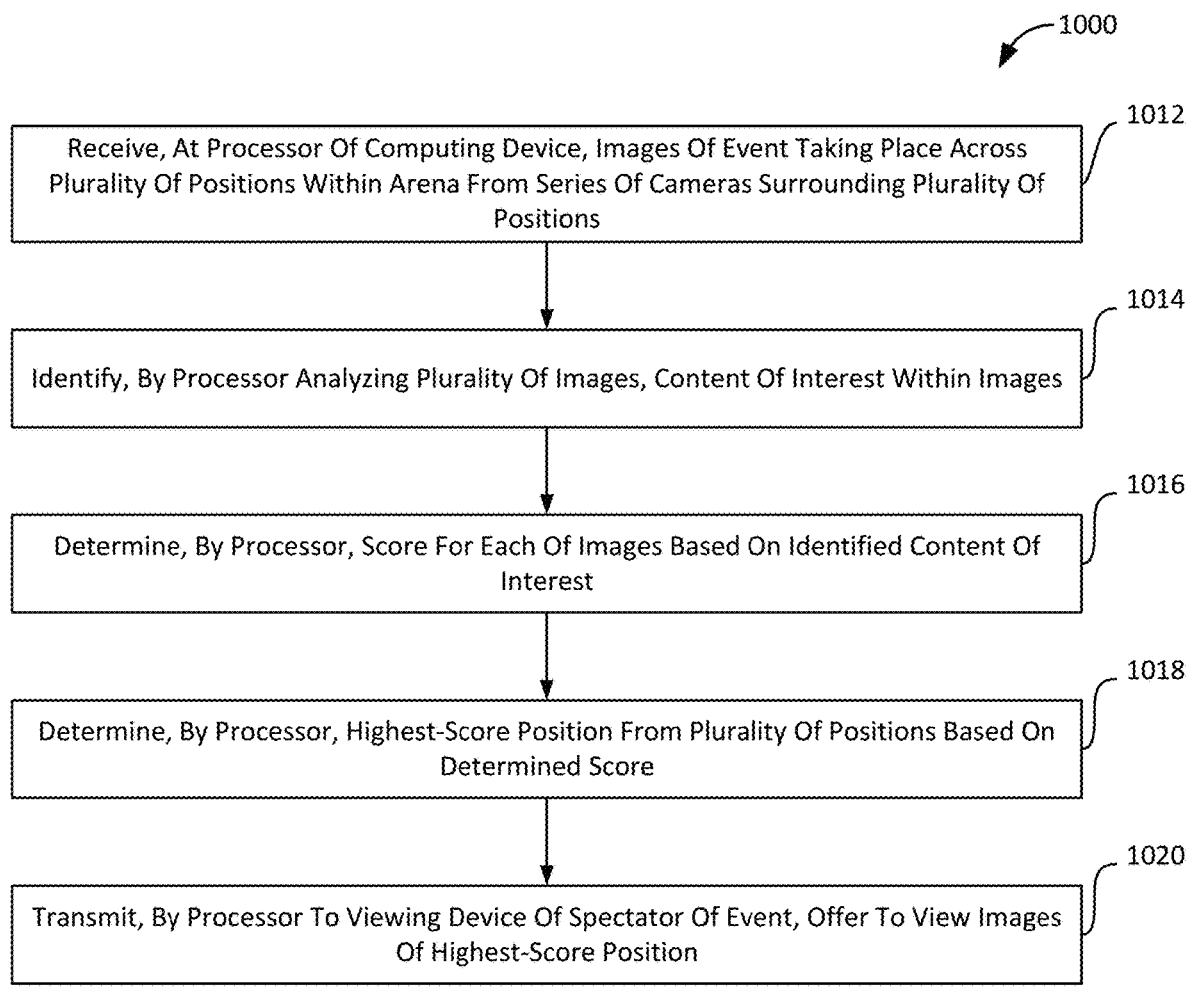
FIGS. 10A, 10B, 10C, 10D, 10E, 10F, 10G, 10H, and/or 10I illustrate operations of methods for delivering on-demand video viewing angles of an arena at a venue in accordance with various embodiments.

FIG. 10A illustrates the method 1000, in accordance with one or more implementations. In block 1012, the processor may perform operations including receiving, at a processor of a computing device, images of an event taking place across a plurality of positions within the arena 100 from a series of cameras 120 surrounding the plurality of positions. The series of cameras 120 may be configured to capture images of each of the plurality of positions from at least three different viewing angles.

In block 1014, the processor may perform operations including identifying, by the processor analyzing the plurality of images, content of interest within the images.

In block 1016, the processor may perform operations including determining, by the processor, a score for each of the images based on the identified content of interest.

In block 1018, the processor may perform operations including determining, by the processor, a highest-score position from the plurality of positions based on the determined score.

In block 1020, the processor may perform operations including transmitting, by the processor to a display device for viewing video of the event, an offer to view images of the highest-score position. The images of the highest-score position may be taken from a select viewing angle.

In some embodiments, the processor may repeat the operations in blocks 1012, 1014, 1016, 1018, and 1020 to periodically or continuously operate a system for delivering on-demand video viewing angles of an arena at a venue until a break in the action, the event is over, or some other defined point.

Figure 10B:
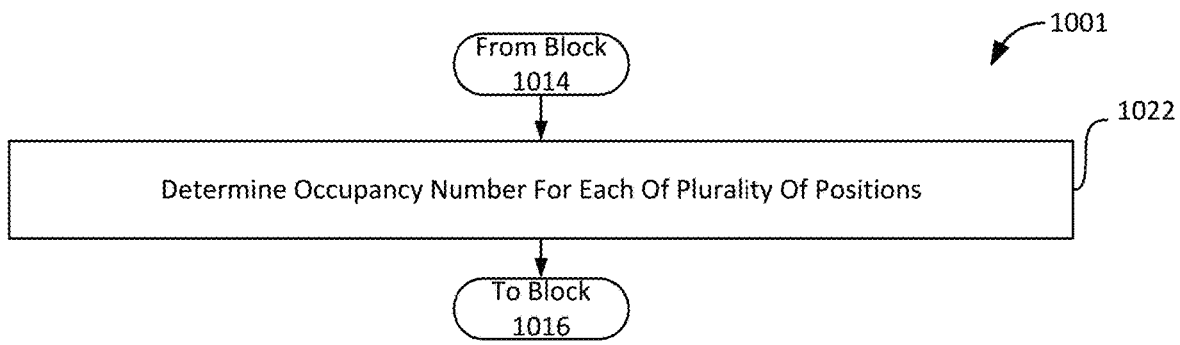

FIG. 10B illustrates method 1001, in accordance with one or more implementations.

In block 1022, following the operations of block 1014 the processor may perform operations including determining an occupancy number for each of the plurality of positions. The occupancy number may correspond to a total number of event participants, event officials, and primary event objects identified within the respective images. Following the operations in block 1022, the processor may perform the operations in block 1016 as described.

In some embodiments, the processor may repeat the operations in block 1022 to periodically or continuously operate a system for delivering on-demand video viewing angles of an arena 100 until a break in the action, the event is over, or some other defined point.

Figure 10C:
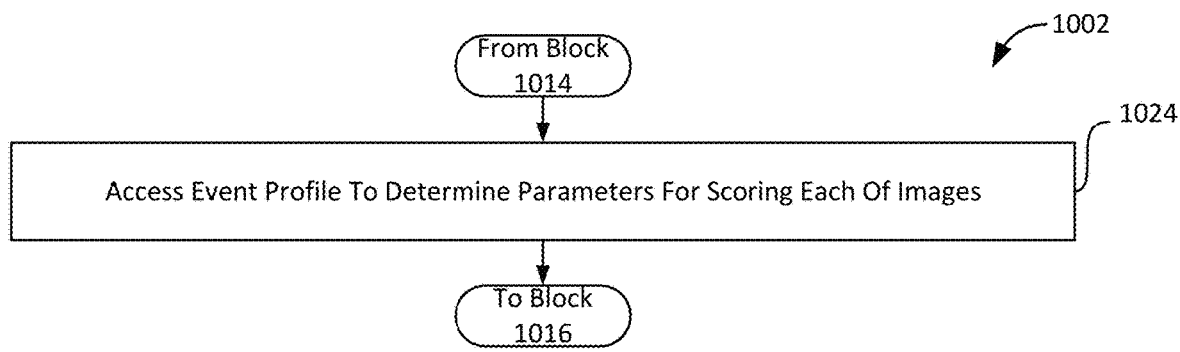

FIG. 10C illustrates method 1002, in accordance with one or more implementations.

In block 1024, following the operations of block 1014 the processor may perform operations including accessing an event profile to determine parameters for scoring each of the images. Determining the score for each of the images may apply the event profile to the identified content for determining the highest-score position. Following the operations in block 1024, the processor may perform the operations in block 1016 as described.

In some embodiments, the processor may repeat the operations in block 1024 to periodically or continuously operate a system for delivering on-demand video viewing angles of an arena at a venue until a break in the action, the event is over, or some other defined point.

Figure 10D:
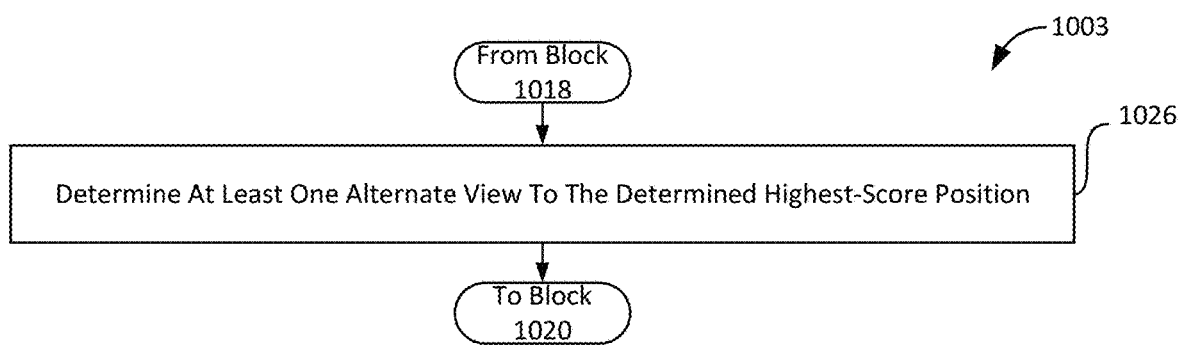

FIG. 10D illustrates method 1003, in accordance with one or more implementations.

In block 1026, following the operations of block 1018 the processor may perform operations including determining at least one alternate view of the determined highest-score position. The at least one alternate view corresponds to images of the highest-score position from more than one different viewing angle than the select viewing angle. Following the operations in block 1026, the processor may perform the operations in block 1020 as described.

In some embodiments, the processor may repeat the operations in block 1026 to periodically or continuously operate a system for delivering on-demand video viewing angles of an arena at a venue until a break in the action, the event is over, or some other defined point.

Figure 10E:
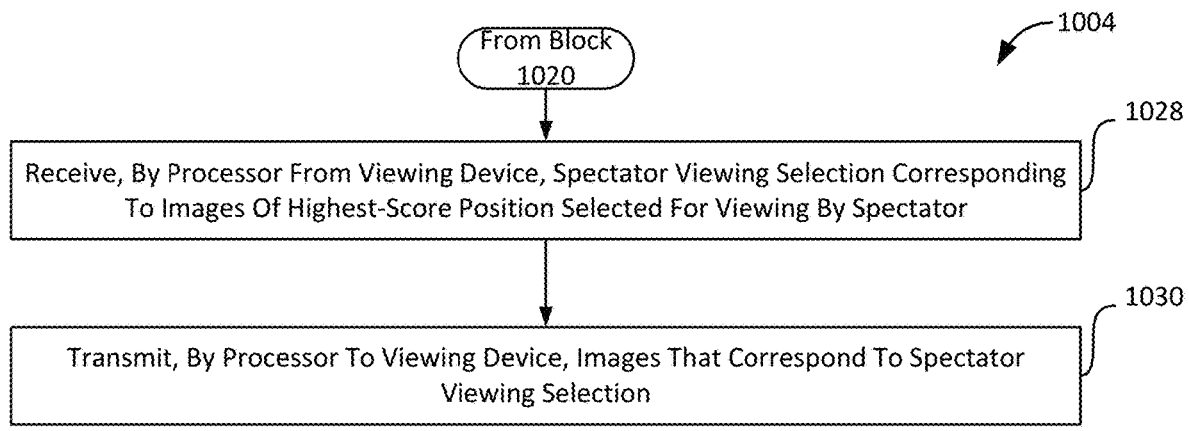

FIG. 10E illustrates method 1004, in accordance with one or more implementations.

In block 1028, following the operations of block 1020 the processor may perform operations including receiving, by the processor from the viewing device, a user selection corresponding to images of the highest-score position selected for viewing by the user.

In block 1030, the processor may perform operations including transmitting, by the processor to the viewing device 50, 60, 65, 70, images that correspond to the user selection. This transmission may include the micro edge cloud 130 and/or the macro edge cloud 140 streaming rendered video (i.e., images) to the user.

In some embodiments, the processor may repeat the operations in blocks 1028 and 1030 to periodically or continuously operate a system for delivering on-demand video viewing angles of an arena 100 at a venue until a break in the action, the event is over, or some other defined point.

Figure 10F:
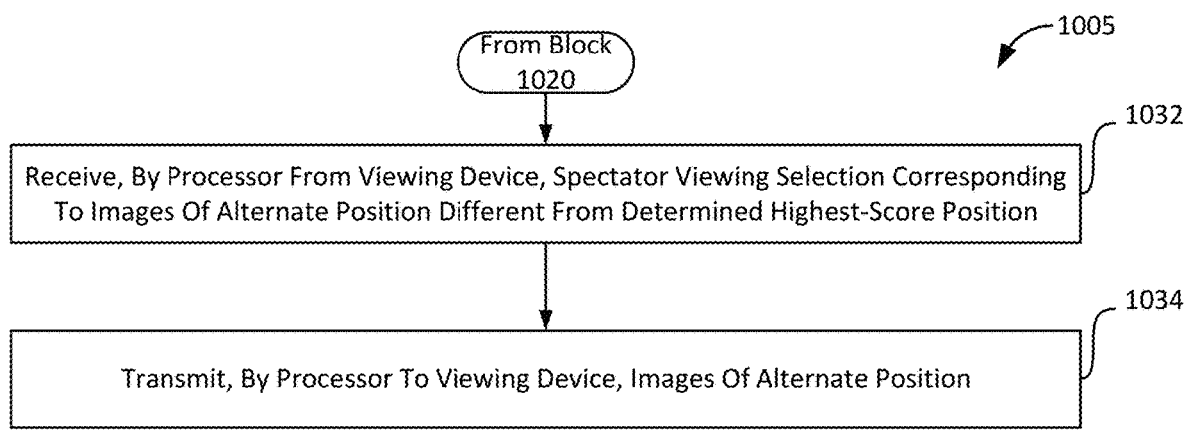

FIG. 10F illustrates method 1005, in accordance with one or more implementations.

In block 1032, following the operations of block 1020 the processor may perform operations including receiving, by the processor from the viewing device 50, 60, 65, 70, a user selection corresponding to images of an alternate position different from the determined highest-score position.

In block 1034, the processor may perform operations including transmitting, by the processor to the viewing device(s) 50, 60, 65, 70, images of the alternate position.

In some embodiments, the processor may repeat the operations in blocks 1032 and 1034 to periodically or continuously operate a system for delivering on-demand video viewing angles of an arena 100 at a venue until a break in the action, the event is over, or some other defined point.

Figure 10G:
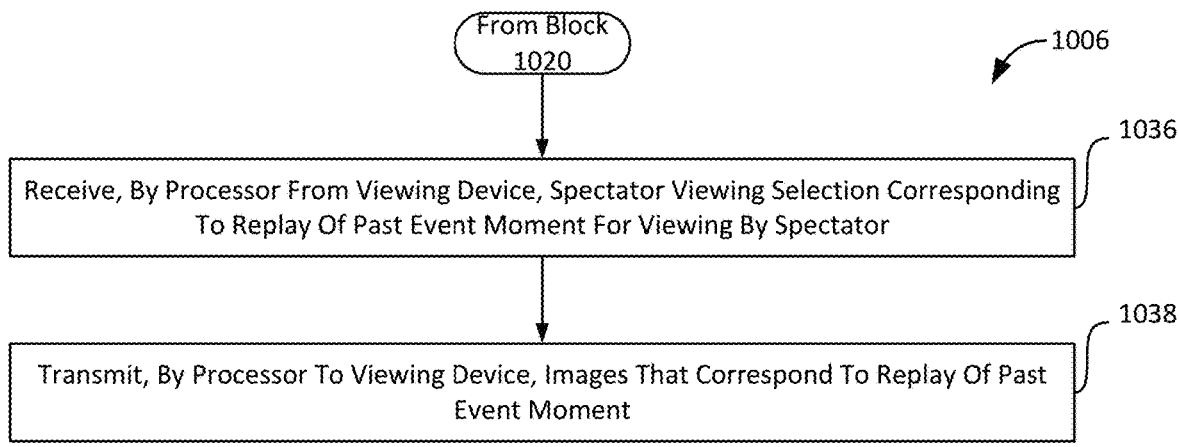

FIG. 10G illustrates method 1006, in accordance with one or more implementations.

In block 1036, following the operations of block 1020 the processor may perform operations including receiving, by the processor from the viewing device 50, 60, 65, 70, a user selection corresponding to a replay of a past event moment for viewing by the user.

In block 1038, the processor may perform operations including transmitting, by the processor to the viewing device 50, 60, 65, 70, images that correspond to the replay of the past event moment.

In some embodiments, the processor may repeat the operations in blocks 1036 and 1038 to periodically or continuously operate a system for delivering on-demand video viewing angles of an arena 100 at a venue until a break in the action, the event is over, or some other defined point.

Figure 10H:
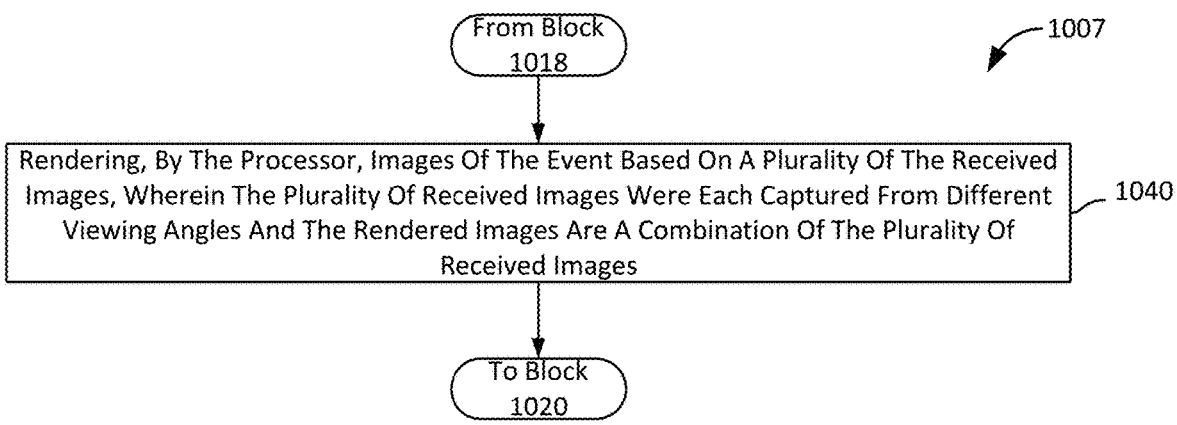

FIG. 10H illustrates method 1007, in accordance with one or more implementations.

In block 1040, following the operations of block 1018 the processor may perform operations including rendering, by the processor, images of the event based on a plurality of the received images, wherein the plurality of received images were each captured from different viewing angles and the rendered images are a combination of the plurality of received images. In this way, the processor may render multiple videos of the same event (e.g., a play in a game). Rendering multiple videos may require significant computing power, which may be better handled or at least supported by one or more processors of the macro edge cloud (e.g., 140). Following the operations in block 1040, the processor may perform the operations in block 1020 as described.

In some embodiments, the processor may repeat the operations in block 1040 to periodically or continuously operate a system for delivering on-demand video viewing angles of an arena 100 at a venue until a break in the action, the event is over, or some other defined point.

Figure 10I:
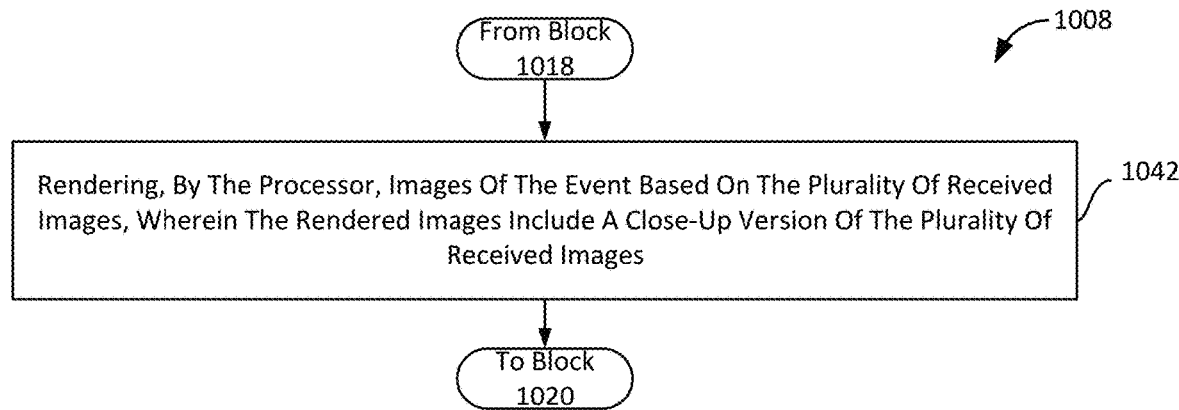

FIG. 10I illustrates method 1008, in accordance with one or more implementations.

In block 1042, following the operations of block 1018 the processor may perform operations including rendering, by the processor, images of the event based on the plurality of received images, wherein the rendered images include a close-up version of the plurality of received images. Following the operations in block 1040, the processor may perform the operations in block 1020 as described.

In some embodiments, the processor may repeat the operations in block 1042 to periodically or continuously operate a system for delivering on-demand video viewing angles of an arena 100 at a venue until a break in the action, the event is over, or some other defined point.

Figure 11:
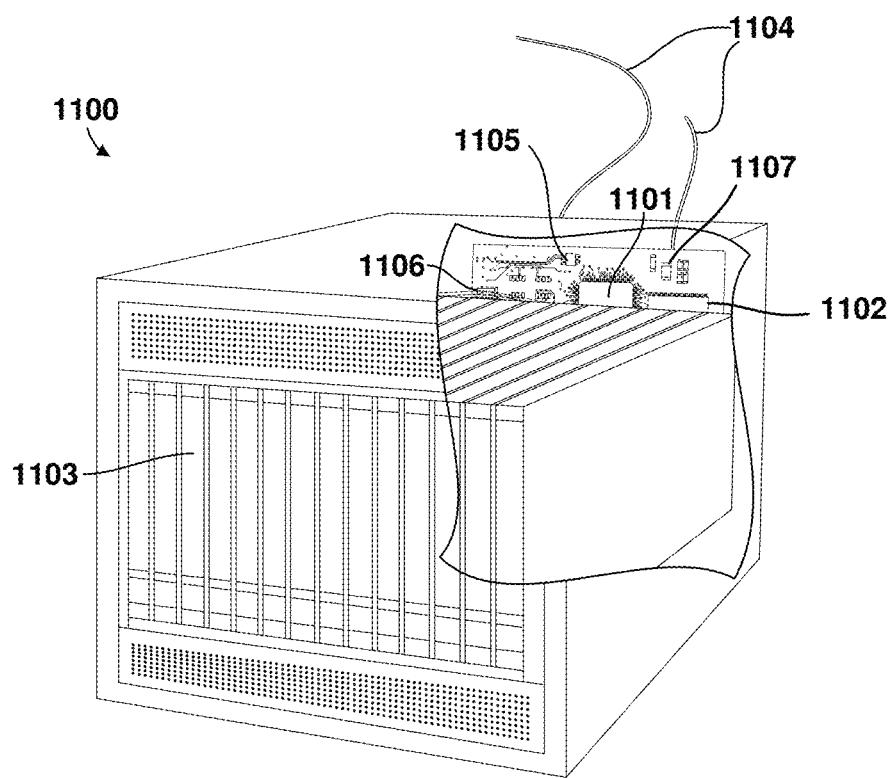
FIG. 11 is a component block diagram of a server suitable for delivering on-demand video viewing angles of an arena at a venue in accordance with various embodiments.

Various embodiments (including, but not limited to, embodiments discussed above with reference to FIGS. 1-10I) may be implemented on any of a variety of commercially available server devices, such as the server 1100 illustrated in FIG. 11. The server 1100 may include a processor 1101 coupled to volatile memory 1102 and a large capacity nonvolatile memory, such as a disk drive 1103. The server 1100 may also include a floppy disc drive, compact disc (CD) or DVD disc drive coupled to the processor 1101. The server 1100 may also include network access ports 1106, 1107 coupled to the processor 1101 for establishing data connections with a network connection circuit 1105 and a communication network (e.g., IP network) coupled to other communication system network elements 1104.

Figure 12:
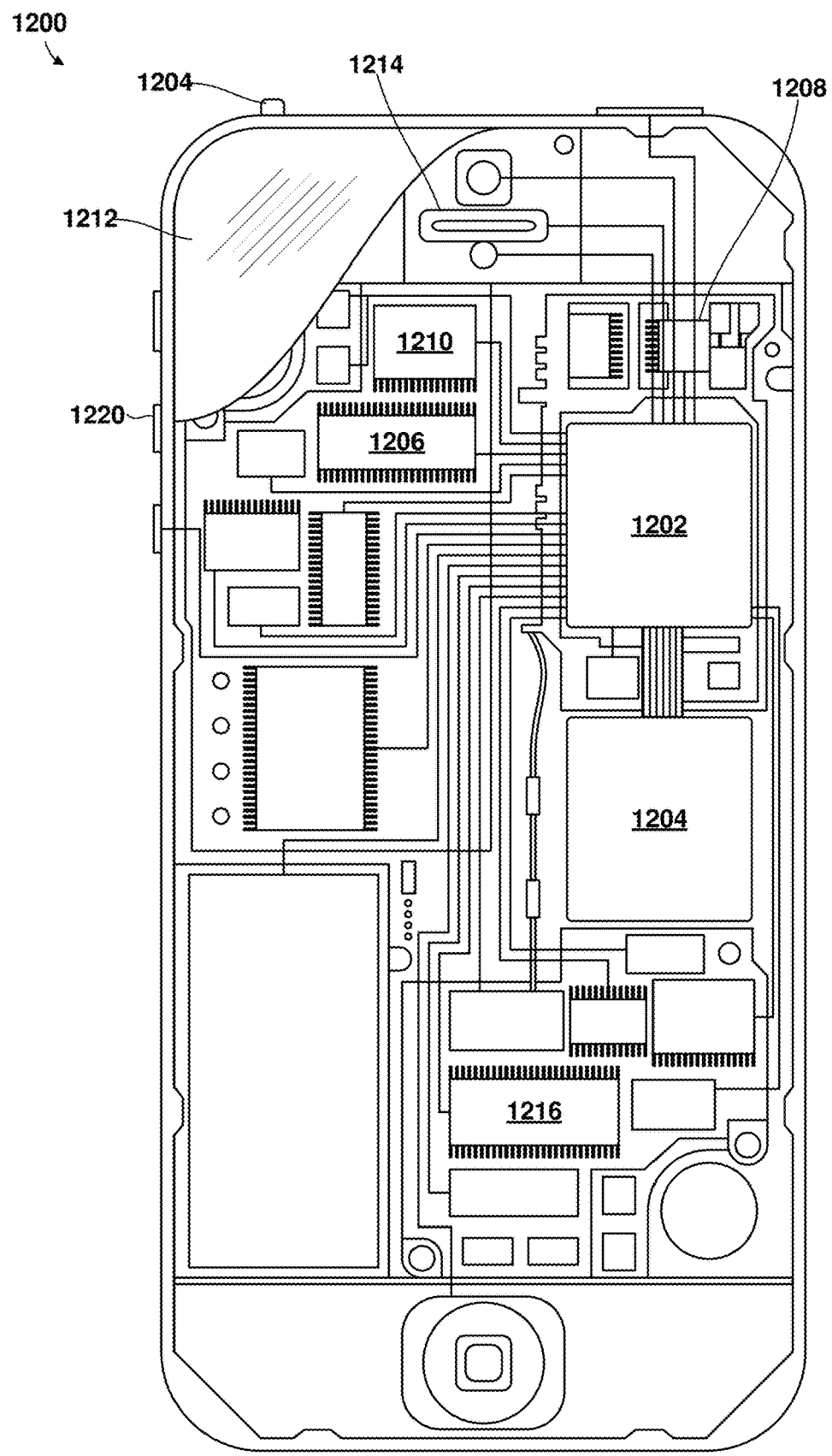
FIG. 12 is a component diagram of an example viewing device in the form of a mobile device, suitable for use with the various embodiments.

FIG. 12 shows a component block diagram of an example viewing device in the form of a mobile device 1200. Various embodiments may be implemented on a variety of wireless computing devices (such as the viewing devices 50), an example of which is illustrated in FIG. 12 in the form of a mobile device 1200. The mobile device 1200 may include one or more processors, such as a first SOC 1202 (such as a SOC-CPU) coupled to a second SOC 1204 (such as a 5G capable SOC). The first and second SOCs 1202, 1204 may be coupled to internal memory 1206, 1216, a display 1212, and to a speaker 1214. Additionally, the mobile device 1200 may include an antenna 1224 for sending and receiving electromagnetic radiation that may be connected to a wireless data link or cellular telephone transceiver 1208 coupled to one or more processors in the first or second SOCs 1202, 1204. Mobile devices 1200 typically also include menu selection buttons or rocker switches 1220 for receiving user inputs.

A typical mobile device 1200 also includes a sound encoding/decoding encoder module 1210, which digitizes sound received from a microphone into data packets suitable for wireless transmission and decodes received sound data packets to generate analog signals that are provided to the speaker to generate sound. Also, one or more of the processors in the first and second SOCs 1202, 1204, wireless transceiver 1208 and encoder module 1210 may include a digital signal processor (DSP) circuit (not shown separately).

The processors of the mobile device 1200 may be any programmable microprocessor, microcomputer or multiple processor chip or chips that can be configured by software instructions (applications) to perform a variety of functions, including the functions of the various implementations described below. In some mobile devices, multiple processors may be provided, such as one processor within a SOC)dedicated to wireless communication functions and one processor within another SOC dedicated to running other applications. Typically, software applications may be stored in the memory 1206, 1216 before they are accessed and loaded into the processor. The processors may include internal memory sufficient to store the application software instructions.

Figure 13:
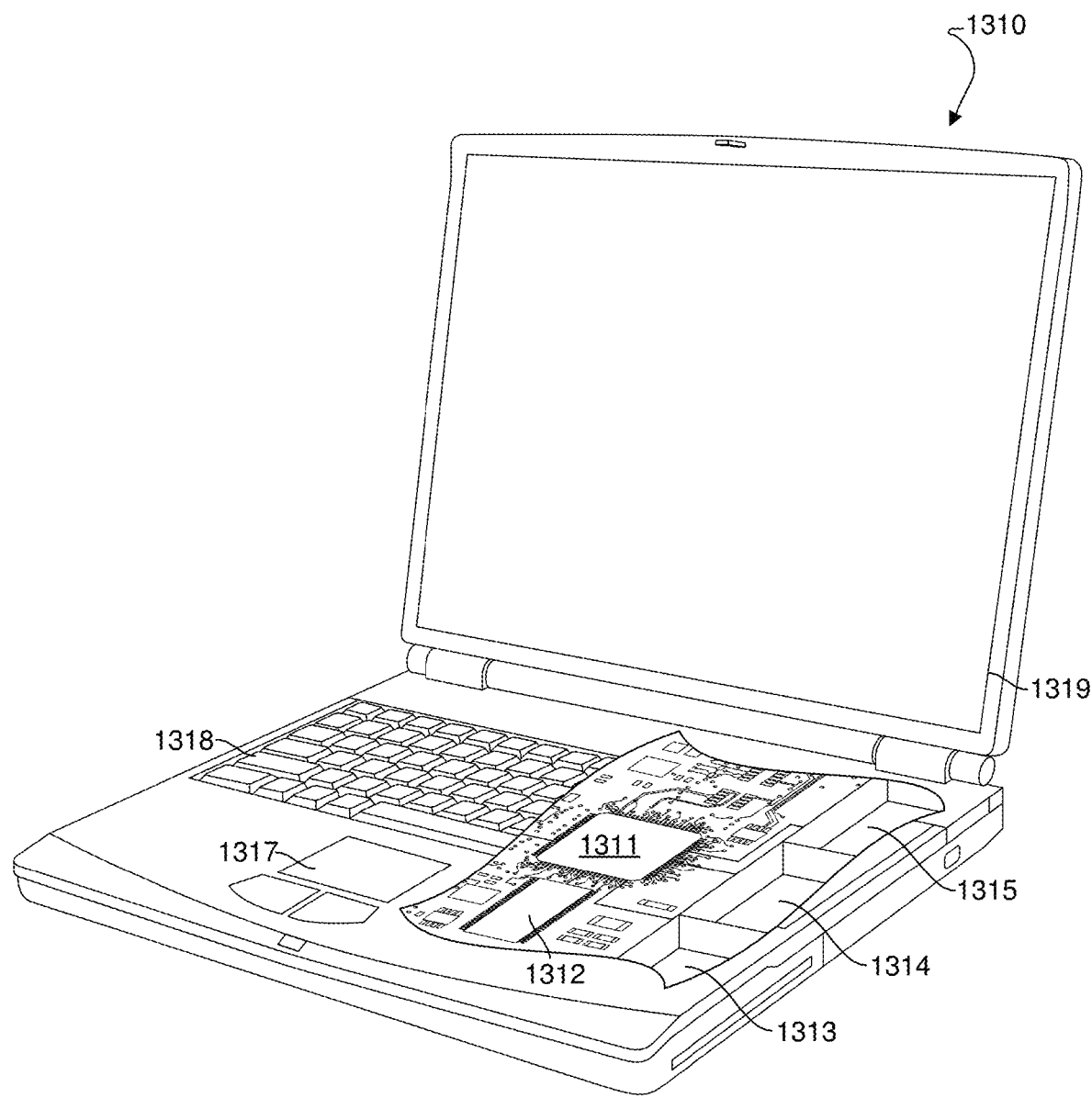
FIG. 13 is a component diagram of an example viewing device in the form of a portable computing device, suitable for use with the various embodiments.

The various embodiments (including, but not limited to, embodiments discussed above with reference to FIGS. 1-12)

described above may also be implemented within a variety of viewing devices, such as a portable computing device 1310 as illustrated in FIG. 13. Many portable computing devices include a touch pad touch surface 1317 that serves as the computer's pointing device, and thus may receive drag, scroll, and flick gestures similar to those implemented on mobile computing devices equipped with a touch screen display and described above. A portable computing device 1310 will typically include a processor 1311 coupled to volatile memory 1312 and a large capacity nonvolatile memory, such as a disk drive 1313 of Flash memory. The portable computing device 1310 may also include a floppy disc drive 1314 and a compact disc (CD) drive 1315 coupled to the processor 1311. The portable computing device 1310 may also include a number of connector ports coupled to the processor 1311 for establishing data connections or receiving external memory devices, such as a USB or FireWire® connector sockets, or other network connection circuits (e.g., interfaces) for coupling the processor 1311 to a network. In a notebook configuration, the computer housing may include the touchpad 1317, the keyboard 1318, and the display 1319 all coupled to the processor 1311. Other configurations of the computing device may include a computer mouse or trackball coupled to the processor (e.g., via a USB input) as are well known, which may also be used in conjunction with the various embodiments.

The processors 236, 1101, 1202, 1204 1311 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 236, 1101, 1202, 1204 1311. The processors 236, 1101, 1202, 1204 1311 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 236, 1101, 1202, 1204 1311 including internal memory or removable memory plugged into the device and memory within the processors 236, 1101, 1202, 1204 1311 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a module may be, but is not limited to, a process running on a processor, a processor, an object, an executable, a thread of execution, a program, or a computer. By way of illustration, both an application running on a computing device and the computing device may be referred to as a module. One or more modules may reside within a process or thread of execution and a module may be localized on one processor or core or distributed between two or more processors or cores. In addition, these modules may execute from various non-transitory processor-readable storage media having various instructions or data structures stored thereon. Modules may communicate by way of local or remote processes, function or procedure calls, electronic signals, data packets, memory read/writes, and other known network, computer, processor, or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a DSP, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable storage media. Additionally, the operations of a method or algorithm may reside as one or any combination or set of codes and/or instructions on a non-transitory server-readable, processor-readable medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for delivering on-demand video viewing angles of an arena at a venue, comprising:
   receiving, at a processor of a computing device, images of an event taking place across a plurality of positions within the arena from a series of cameras surrounding the plurality of positions, wherein the series of cameras are configured to capture images of each of the plurality of positions from at least three different viewing angles;
   accessing user preferences of a select user to determine parameters for scoring each of the images, wherein the user preferences identify a location within the arena providing a preferred vantage point of a viewing angle;
   identifying, by the processor analyzing the plurality of images, content of interest within the images for the select user based on the user preferences;
   determining, by the processor, a score for each of the images by applying the user preferences to the identified content of interest for the select user, wherein determining the score for each of the images uses the viewing angle from the preferred vantage point, wherein determining the score for each of the images lowers the score for images from a primary viewing angle of the select user to reduce the likelihood that images from the primary viewing angle will be offered for viewing, wherein the determined score for each image is a sum of all values associated with that respective image;
   determining, by the processor, a highest-score position from the plurality of positions based on the determined scores; and
   transmitting, by the processor to a viewing device of the select user for viewing video of the event, an offer to view images of the highest-score position, wherein the images of the highest-score position are taken from a select viewing angle.

2. The method of claim 1, wherein the content of interest includes at least one of an event participant, an event official, a primary event object, or arena landmarks.

3. The method of claim 1, wherein determining the highest-score position further comprises:
   determining an occupancy number for each of the plurality of positions, wherein the occupancy number corresponds to a total number of event participants, event officials, and primary event objects identified within the respective images.

4. The method of claim 1, further comprising:
   accessing an event profile to determine parameters for scoring each of the images, wherein determining the score for each of the images further comprises applying the event profile to the identified content for determining the highest-score position.

5. The method of claim 4, wherein the event profile includes at least one identifier selected from a group consisting of event rules, event patterns, participants, or participant group identifiers.

6. The method of claim 4, wherein the event profile includes the primary viewing angle of the select user.

7. The method of claim 4, wherein the event profile includes the preferred viewing angle of the select user.

8. The method of claim 1, further comprising:
   determining at least one alternate view of the determined highest-score position, wherein the at least one alternate view corresponds to images of the highest-score position from more than one different viewing angle than the select viewing angle.

9. The method of claim 8, wherein transmitting the offer to view images of the highest-score position includes the images from the more than one different viewing angle than the select viewing angle.

10. The method of claim 1, further comprising:
    receiving, by the processor from the viewing device, a user selection corresponding to images of the highest-score position selected for viewing by the select user; and
    transmitting, by the processor to the viewing device, video that corresponds to the user selection.

11. The method of claim 1, further comprising:
    receiving, by the processor from the viewing device, a user request from the select user for images of an alternate position, different from the determined highest-score position; and
    transmitting, by the processor to the viewing device, video of a viewing angle from the alternate position.

12. The method of claim 1, further comprising:
    receiving, by the processor from the viewing device, a user selection corresponding to a replay of a past event moment for viewing by the select user; and
    transmitting, by the processor to the viewing device, images that correspond to the replay of the past event moment.

13. The method of claim 12, wherein the past event moment was captured at a previous time that is a predetermined interval from a live broadcast time of the event.

14. The method of claim 1, further comprising:
    rendering, by the processor, video of the event based on a plurality of the received images, wherein the plurality of received images were each captured from different viewing angles and the rendered images are a combination of the plurality of received images.

15. The method of claim 1, further comprising:
    rendering, by the processor, video of the event based on the plurality of received images, wherein the rendered images include a close-up version of the plurality of received images.

16. A computing device comprising:
    a transceiver; and
    a processor coupled to the transceiver, wherein the processor is configured with processor-executable instructions to perform operations for delivering on-demand video viewing angles of an arena at a venue, the operations comprising:
    receiving images of an event taking place across a plurality of positions within the arena from a series of cameras surrounding the plurality of positions, wherein the series of cameras are configured to capture images of each of the plurality of positions from at least three different viewing angles;
    accessing user preferences of a select user to determine parameters for scoring each of the images, wherein the user preferences identify a location within the arena providing a preferred vantage point of a viewing angle;
    identifying, by analyzing the plurality of images, content of interest within the images for the select user based on the user preferences;
    determining a score for each of the images by applying the user preferences to the identified content of interest for the select user, wherein determining the score for each of the images uses the viewing angle from the preferred vantage point, wherein determining the score for each of the images lowers the score for images from a primary viewing angle of the select user to reduce the likelihood that images from the primary viewing angle will be offered for viewing, wherein the determined score for each image is a sum of all values associated with that respective image;
    determining a highest-score position from the plurality of positions based on the determined scores; and
    transmitting, using the transceiver, to a viewing device of the select user for viewing video of the event, an offer to view images of the highest-score position, wherein the images of the highest-score position are taken from a select viewing angle.

17. The computing device of claim 16, wherein processor is configured with processor-executable instructions to perform operations such that the content of interest includes at least one of an event participant, an event official, a primary event object, or arena landmarks.

18. The computing device of claim 16, wherein processor is configured with processor-executable instructions to perform operations such that determining the highest-score position further comprises:
    determining an occupancy number for each of the plurality of positions, wherein the occupancy number corresponds to a total number of event participants, event officials, and primary event objects identified within the respective images.

19. The computing device of claim 16, wherein processor is configured with processor-executable instructions to perform operations such that comprising:
    accessing an event profile to determine parameters for scoring each of the images, wherein determining the score for each of the images further comprises applying the event profile to the identified content for determining the highest-score position.

20. The computing device of claim 19, wherein processor is configured with processor-executable instructions to perform operations such that the event profile includes at least one identifier selected from a group consisting of event rules, event patterns, participants, or participant group identifiers.

21. The computing device of claim 19, wherein processor is configured with processor-executable instructions to perform operations such that the event profile includes the preferred viewing angle of the select user.

22. The computing device of claim 19, wherein processor is configured with processor-executable instructions to perform operations such that the event profile includes the preferred viewing angle of the select user.

23. The computing device of claim 16, wherein processor is configured with processor-executable instructions to perform operations further comprising:
    determining at least one alternate view of the determined highest-score position, wherein the at least one alternate view corresponds to images of the highest-score position from more than one different viewing angle than the select viewing angle.

24. The computing device of claim 23, wherein processor is configured with processor-executable instructions to perform operations such that transmitting the offer to view images of the highest-score position includes the images from the more than one different viewing angle than the select viewing angle.

25. The computing device of claim 16, wherein processor is configured with processor-executable instructions to perform operations further comprising:
    receiving, by the processor from the viewing device, a user selection corresponding to images of the highest-score position selected for viewing by the select user; and
    transmitting, by the processor to the viewing device, video that corresponds to the user selection.

26. The computing device of claim 16, wherein processor is configured with processor-executable instructions to perform operations further comprising:
    receiving, by the processor from the viewing device, a user request from the select user for images of an alternate position, different from the determined highest-score position; and
    transmitting, by the processor to the viewing device, video of a viewing angle from the alternate position.

27. The computing device of claim 16, wherein processor is configured with processor-executable instructions to perform operations further comprising:
    receiving, by the processor from the viewing device, a user selection corresponding to a replay of a past event moment for viewing by the select user; and
    transmitting, by the processor to the viewing device, images that correspond to the replay of the past event moment.

28. The computing device of claim 27, wherein processor is configured with processor-executable instructions to perform operations such that the past event moment was captured at a previous time that is a predetermined interval from a live broadcast time of the event.

29. The computing device of claim 16, wherein processor is configured with processor-executable instructions to perform operations further comprising:
    rendering, by the processor, video of the event based on a plurality of the received images, wherein the plurality of received images were each captured from different viewing angles and the rendered images are a combination of the plurality of received images.

30. The computing device of claim 16, wherein processor is configured with processor-executable instructions to perform operations further comprising:
    rendering, by the processor, video of the event based on the plurality of received images, wherein the rendered images include a close-up version of the plurality of received images.

31. A non-transitory processor-readable storage medium having stored thereon processor-executable instructions configured to cause a processor to perform operations for delivering on-demand video viewing angles of an arena at a venue, the operations comprising:
- receiving images of an event taking place across a plurality of positions within the arena from a series of cameras surrounding the plurality of positions, wherein the series of cameras are configured to capture images of each of the plurality of positions from at least three different viewing angles;
- accessing user preferences of a select user to determine parameters for scoring each of the images, wherein the user preferences identify a location within the arena providing a preferred vantage point of a viewing angle;
- identifying, by analyzing the plurality of images, content of interest within the images for the select user based on the user preferences;
- determining a score for each of the images by applying the user preferences to the identified content of interest for the select user, wherein determining the score for each of the images uses the viewing angle from the preferred vantage point, wherein determining the score for each of the images lowers the score for images from a primary viewing angle of the select user to reduce the likelihood that images from the primary viewing angle will be offered for viewing, wherein the determined score for each image is a sum of all values associated with that respective image;
- determining a highest-score position from the plurality of positions based on the determined scores; and
- transmitting, to a viewing device of the select user for viewing video of the event, an offer to view images of the highest-score position, wherein the images of the highest-score position are taken from a select viewing angle.

32. The non-transitory processor-readable storage medium of claim 31, wherein the processor is configured with processor-executable instructions to perform operations such that the content of interest includes at least one of an event participant, an event official, a primary event object, or arena landmarks.

33. The non-transitory processor-readable storage medium of claim 31, wherein the processor is configured with processor-executable instructions to perform operations such that determining the highest-score position further comprises:
- determining an occupancy number for each of the plurality of positions, wherein the occupancy number corresponds to a total number of event participants, event officials, and primary event objects identified within the respective images.

34. The non-transitory processor-readable storage medium of claim 31, wherein the processor is configured with processor-executable instructions to perform operations further comprising:
- accessing an event profile to determine parameters for scoring each of the images, wherein determining the score for each of the images applies the event profile to the identified content for determining the highest-score position.

35. The non-transitory processor-readable storage medium of claim 34, wherein the processor is configured with processor-executable instructions to perform operations such that the event profile includes at least one identifier selected from a group consisting of event rules, event patterns, participants, or participant group identifiers.

36. The non-transitory processor-readable storage medium of claim 34, wherein the processor is configured with processor-executable instructions to perform operations such that the event profile includes the primary viewing angle of the select user.

37. The non-transitory processor-readable storage medium of claim 34, wherein the processor is configured with processor-executable instructions to perform operations such that the event profile includes the preferred viewing angle of the select user.

38. The non-transitory processor-readable storage medium of claim 31, wherein the processor is configured with processor-executable instructions to perform operations further comprising:
- determining at least one alternate view of the determined highest-score position, wherein the at least one alternate view corresponds to images of the highest-score position from more than one different viewing angle than the select viewing angle.

39. The non-transitory processor-readable storage medium of claim 38, wherein the processor is configured with processor-executable instructions to perform operations such that transmitting the offer to view images of the highest-score position includes the images from the more than one different viewing angle than the select viewing angle.

40. The non-transitory processor-readable storage medium of claim 31, wherein the processor is configured with processor-executable instructions to perform operations further comprising:
- receiving, by the processor from the viewing device, a user selection corresponding to images of the highest-score position selected for viewing by the select user; and
- transmitting, by the processor to the viewing device, video that corresponds to the user selection.

41. The non-transitory processor-readable storage medium of claim 31, wherein the processor is configured with processor-executable instructions to perform operations further comprising:
- receiving, by the processor from the viewing device, a user request from the select user for images of an alternate position, different from the determined highest-score position; and
- transmitting, by the processor to the viewing device, video of a viewing angle from the alternate position.

42. The non-transitory processor-readable storage medium of claim 31, wherein the processor is configured with processor-executable instructions to perform operations further comprising:
- receiving, by the processor from the viewing device, a user selection corresponding to a replay of a past event moment for viewing by the select user; and
- transmitting, by the processor to the viewing device, images that correspond to the replay of the past event moment.

43. The non-transitory processor-readable storage medium of claim 42, wherein the processor is configured with processor-executable instructions to perform operations such that the past event moment was captured at a previous time that is a predetermined interval from a live broadcast time of the event.

44. The non-transitory processor-readable storage medium of claim 31, wherein the processor is configured with processor-executable instructions to perform operations further comprising:

rendering, by the processor, video of the event based on a plurality of the received images, wherein the plurality of received images were each captured from different viewing angles and the rendered images are a combination of the plurality of received images.

45. The non-transitory processor-readable storage medium of claim 31, wherein the processor is configured with processor-executable instructions to perform operations further comprising:

rendering, by the processor, video of the event based on the plurality of received images, wherein the rendered images include a close-up version of the plurality of received images.

* * * * *